US009519496B2

(12) United States Patent
Starks et al.

(10) Patent No.: US 9,519,496 B2
(45) Date of Patent: Dec. 13, 2016

(54) DETECTING AND PREVENTING VIRTUAL DISK STORAGE LINKAGE FAULTS

(75) Inventors: John A. Starks, Seattle, WA (US); Dustin L. Green, Redmond, WA (US); Todd William Harris, Sammamish, WA (US); Mathew John, Redmond, WA (US); Senthil Rajaram, Seattle, WA (US); Eric Traut, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 13/094,620

(22) Filed: Apr. 26, 2011

(65) Prior Publication Data

US 2012/0278799 A1 Nov. 1, 2012

(51) Int. Cl.
*G06F 9/455* (2006.01)
*G06F 3/12* (2006.01)
*G06F 3/06* (2006.01)

(52) U.S. Cl.
CPC ............ *G06F 9/455* (2013.01); *G06F 3/0619* (2013.01); *G06F 3/0664* (2013.01); *G06F 3/0683* (2013.01); *G06F 3/0644* (2013.01); *G06F 3/0689* (2013.01); *G06F 3/121* (2013.01)

(58) Field of Classification Search
CPC .... G06F 9/455; G06F 9/45533; G06F 12/109; G06F 3/0619; G06F 3/121; G06F 17/30067; G11B 2020/18
USPC .............................. 718/1; 711/161, 162, 170
See application file for complete search history.

(56) References Cited

U.S. PATENT DOCUMENTS

| 5,043,866 A | 8/1991 | Myre, Jr. et al. |
| 6,304,983 B1 | 10/2001 | Lee et al. |
| 6,545,833 B1 * | 4/2003 | Ee .................... G06F 3/0601 360/53 |
| 6,578,041 B1 | 6/2003 | Lomet |
| 6,697,881 B2 | 2/2004 | Cochran |

(Continued)

FOREIGN PATENT DOCUMENTS

| CN | 101421715 A | 4/2009 |
| CN | 101421715 A1 | 4/2009 |

(Continued)

OTHER PUBLICATIONS

"Deploying Virtual Hard Disk Images", .technet.microsoft.com-en-us-library-dd363560(WS.10,printer).aspx, accessed Dec. 8, 2010, 1-8.

(Continued)

*Primary Examiner* — Abu Ghaffari
(74) *Attorney, Agent, or Firm* — John Jardine; Dan Choi; Micky Minhas

(57) ABSTRACT

In an exemplary embodiment, a virtual disk file can be assigned an identifier and a virtual disk files that is dependent on the virtual disk file can include a copy of the identifier. In the instance that the virtual disk file is opened and data is modified that causes the contents of a virtual disk extent to change the identifier can be changed. If the virtual disk file and the dependent virtual disk file are used to instantiate a virtual disk the difference between identifiers can be detected, which is indicative of the fact that the virtual disk may be corrupted. Other techniques are described in the detailed description, claims, and figures that form a part of this document.

20 Claims, 16 Drawing Sheets

(56) References Cited

U.S. PATENT DOCUMENTS

| | | |
|---|---|---|
| 7,107,385 B2* | 9/2006 | Rajan et al. ............... 711/4 |
| 7,299,333 B2* | 11/2007 | Mizuno et al. ............. 711/170 |
| 7,373,548 B2 | 5/2008 | Reinhardt et al. |
| 7,386,662 B1 | 6/2008 | Kekre et al. |
| 7,447,854 B1* | 11/2008 | Cannon ............... G06F 11/1451 711/162 |
| 7,567,985 B1 | 7/2009 | Comay et al. |
| 7,694,105 B2 | 4/2010 | Sanvido |
| 7,783,833 B2* | 8/2010 | Kumagai ............... 711/114 |
| 7,801,852 B2 | 9/2010 | Wong et al. |
| 7,831,550 B1* | 11/2010 | Pande ............... G06F 17/30575 707/610 |
| 7,870,172 B1* | 1/2011 | Sarma ............... 707/822 |
| 7,886,115 B2 | 2/2011 | Sanvido et al. |
| 7,996,636 B1* | 8/2011 | Prakash ............... G06F 3/0619 711/162 |
| 8,046,550 B2* | 10/2011 | Feathergill ............ G06F 11/1466 711/162 |
| 8,261,267 B2 | 9/2012 | Iwamatsu et al. |
| 8,301,854 B2* | 10/2012 | Nakagawa ............ G06F 3/0605 711/161 |
| 8,332,370 B2* | 12/2012 | Gattegno et al. ............ 707/695 |
| 8,688,632 B2 | 4/2014 | Niki |
| 8,825,936 B2* | 9/2014 | Wade ............... G06F 3/0608 711/162 |
| 2002/0178335 A1 | 11/2002 | Selkirk et al. |
| 2003/0058238 A1 | 3/2003 | Doak et al. |
| 2003/0105810 A1 | 6/2003 | McCrory et al. |
| 2004/0210591 A1 | 10/2004 | Hirschfeld et al. |
| 2005/0071388 A1 | 3/2005 | Fienblit et al. |
| 2006/0218544 A1 | 9/2006 | Chakraborty et al. |
| 2007/0244938 A1 | 10/2007 | Michael et al. |
| 2007/0260831 A1 | 11/2007 | Michael et al. |
| 2008/0104345 A1* | 5/2008 | Maruyama .......... G06F 11/0796 711/162 |
| 2008/0120470 A1 | 5/2008 | Dhamankar et al. |
| 2008/0147755 A1 | 6/2008 | Chapman |
| 2008/0155223 A1 | 6/2008 | Hiltgen et al. |
| 2008/0177809 A1* | 7/2008 | Murayama ............ G06F 3/0665 |
| 2009/0157942 A1* | 6/2009 | Kulkarni ............... G06F 3/0604 711/6 |
| 2009/0198731 A1 | 8/2009 | Noonan, III |
| 2009/0282101 A1 | 11/2009 | Lim et al. |
| 2010/0042796 A1 | 2/2010 | Vasilevsky et al. |
| 2010/0070725 A1* | 3/2010 | Prahlad et al. ............... 711/162 |
| 2010/0122248 A1 | 5/2010 | Robinson et al. |
| 2010/0125705 A1 | 5/2010 | Mehra et al. |
| 2010/0138832 A1* | 6/2010 | Kim ................... G06F 9/45537 718/1 |
| 2010/0211737 A1 | 8/2010 | Flynn et al. |
| 2010/0228913 A1 | 9/2010 | Czezatke et al. |
| 2010/0235831 A1 | 9/2010 | Dittmer |
| 2010/0241785 A1 | 9/2010 | Chen et al. |
| 2010/0250630 A1* | 9/2010 | Kudo ................ 707/822 |
| 2010/0299368 A1 | 11/2010 | Hutchins et al. |
| 2010/0306467 A1* | 12/2010 | Pruthi et al. ................ 711/114 |
| 2010/0333090 A1* | 12/2010 | Wright ............... G06F 9/45516 718/1 |
| 2011/0055406 A1 | 3/2011 | Piper et al. |
| 2011/0072059 A1 | 3/2011 | Guarraci |
| 2011/0179414 A1* | 7/2011 | Goggin .................. G06F 3/061 718/1 |
| 2011/0197022 A1 | 8/2011 | Green et al. |
| 2012/0042141 A1* | 2/2012 | Tatara .................. G06F 3/0607 711/162 |
| 2012/0079583 A1 | 3/2012 | Christiansen et al. |
| 2012/0110259 A1 | 5/2012 | Mills et al. |
| 2012/0110281 A1 | 5/2012 | Green et al. |
| 2012/0233434 A1 | 9/2012 | Starks et al. |

FOREIGN PATENT DOCUMENTS

| | | |
|---|---|---|
| CN | 101443748 A | 5/2009 |
| JP | 2004-185349 A | 7/2004 |
| JP | 2004-295870 A | 10/2004 |
| JP | 2005-128861 A | 5/2005 |
| JP | 2007-279883 A | 10/2007 |
| JP | 2009-533777 A | 9/2009 |
| JP | 2010-033206 | 2/2010 |

OTHER PUBLICATIONS

"Using Differencing Disks", .technet.microsoft.com-en-us-library-cc720381(WS.10,printer).aspx, accessed Dec. 8, 2010, 1-3.

"How to Resize a Microsoft Virtual Hard Drive (VHD)", sysadmingeek.com-articles-how-to-resize-a-microsoft-virtual-hard-drive-vhd-file-, accessed Jan. 24, 2011, 1-10.

Agarwal, "Distributed Checkpointing of Virtual Machines In Xen Framework", Thesis Submitted in Partial Fulfillment of The Requirements for the Degree of Master of Technology in Computer Science and Engineering, Department of Computer Science and Engineering, Indian Institute of Technology, Kharagpur, May 2008, 1-44.

Elnozahy et al., "The performance of Consistent Checkpointing", 11th Symposium on Reliable Distributed Systems, Houston, TX, USA, Oct. 5-7, 1992, 39-47.

International Patent Application No. PCT/US2011/055586, International Search Report dated May 31, 2012, 8 pages.

International Patent Application No. PCT/US2011/055591, International Search Report dated May 31, 2012, 8 pages.

"FSCTL_FILE_LEVEL_TRIM Control Code", Retrieved on: Jul. 11, 2012, Available at: msdn.microsoft.com/en-us/library/windows/hardware/hh451098(v=vs.85).aspx.

"TRIM/UNMAP Support in Windows Server 2012 & Hyper-V/VHDX", Published on: May 23, 2012, Available at: workinghardinitwordpress.com/2012/05/23/trimunmap-support-in-windows-server-2012-hyper-vvhdx/.

Campbell, Lisa, "Hyper-V Scalability Evident in Its New Virtual Disk Format", Published on: Jul. 9, 2012, Available at: .unitrends.com/hyper-v-backup/hyper-v-scalability-evident-virtual-disk-format/.

International Patent Application No. PCT/US2012/027645: International Search Report and Written Opinion dated Sep. 25, 2012, 9 pages.

"Troubleshooting Parent Virtual Disk Errors in Fusion", kb.vmware.com-selfservice-microsites-search.do?language=en_US&cmd=displayKC&externalId=1018832, accessed Feb. 23, 2011, 1-7.

"Virtual Hard Disk Image Format Specification", Microsoft Corporation, Oct. 11, 2006, 1-8.

"VMWare Recovering Vmware Snapshot after Parent Changed", it.it-larsen.dk-index.php?option=com_content&view=article&id=6:vmware-recovering-vmware-snapshot-after-parent-changed&catid=1:vmware-35&Itemid=4, accessed Feb. 23, 2011, 1-3.

Kerr, "The Virtual Disk API in Windows 7", msdn.microsoft.com-en-us-magazine-dd569754.aspx, accessed Feb. 23, 2011, 1-7.

Yang et al., "Windows Server 2008", Virtual Hard Disk Performance, A Microsoft White Paper, Mar. 2010, 1-35.

"Search Report Received for European Patent Application No. 11864454.1", Mailed Date : Oct. 28, 2014, 10 Pages. (MS# 332042.04).

"VHDX Format Specification Version 1.00"; Microsoft Corporation; Specification; Aug. 2012; 37 pages.

* cited by examiner

DETECTING AND PREVENTING VIRTUAL DISK STORAGE LINKAGE FAULTS

BACKGROUND

Storage virtualization technology allows for the separation of logical storage from physical storage. One exemplary use case for storage virtualization is within a virtual machine. A layer of virtualizing software (typically called a hypervisor or virtual machine monitor) is installed on a computer system and controls how virtual machines interact with the physical hardware. Since guest operating systems are typically coded to exercise exclusive control over the physical hardware, the virtualizing software can be configured to subdivide resources of the physical hardware and emulate the presence of physical hardware within the virtual machines. Another use case for storage virtualization is within a computer system configured to implement a storage array. In this case, physical computer systems or virtual machines can be connected to the storage array using the iSCSI protocol, or the like.

A storage handling module can be used to emulate storage for either a virtual or physical machine. For example, a storage handling module can handle storage IO jobs issued by a virtual or physical machine by reading and writing to one or more virtual disk files, which can be used to describe, i.e., store, the extents of the virtual disk, i.e., a contiguous area of storage such as a block. Likewise, the storage handling program can respond to write requests by writing bit patterns data for the virtual disk to one or more virtual disk files and respond to read requests by reading the bit patterns stored in the one or more virtual disk files.

SUMMARY

In an exemplary embodiment, a virtual disk file can be assigned an identifier and a virtual disk files that is dependent on the virtual disk file can include a copy of the identifier. In the instance that the virtual disk file is opened and data is modified that causes the contents of a virtual disk extent to change the identifier can be changed. If the virtual disk file and the dependent virtual disk file are used to instantiate a virtual disk the difference between identifiers can be detected, which is indicative of the fact that the virtual disk may be corrupted.

In the same, or another exemplary embodiment, a normalized bitmap for a group of virtual disk extents can be persisted. An identifier can be stored in a virtual disk file and a copy of the identifier can be associated with the normalized bitmap. When a modification is made to the virtual disk file the identifier can be updated. In the instance that the normalized bitmap accurately reflects sector bitmaps for the group of virtual disk extents, the copy of the identifier associated with the normalized bitmaps can be updated. When virtual disk file is opened at a later time, a match of the two identifiers indicates that the normalized bitmap accurately reflects sector bitmaps for the group of virtual disk extents and the bitmap can be used. In addition to the foregoing, other techniques are described in the claims, the detailed description, and the figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., an execution unit that reads and executes instructions, configured by firmware and/or software. Processor(s) and the like can be configured by instructions loaded from memory, e.g., RAM, ROM, firmware, and/or mass storage, and the instructions can embody logic operable to configure the processor to perform one or more function. A specific example of circuitry can include a combination of hardware and software. In this specific example, an implementer may write source code embodying logic that is subsequently compiled into machine readable code that can be executed by the processor.

One skilled in the art can appreciate that the state of the art has evolved to a point where there is little difference between functions implemented in hardware and functions implemented in software (which are subsequently executed by hardware). As such, the description of functions as being implemented in hardware or software is merely a design choice. Simply put, since a software process can be transformed into an equivalent hardware structure and a hardware structure can itself be transformed into an equivalent software process, functions described as embodied in instructions could alternatively be implemented in hardware and vice versa.

Figure 1:
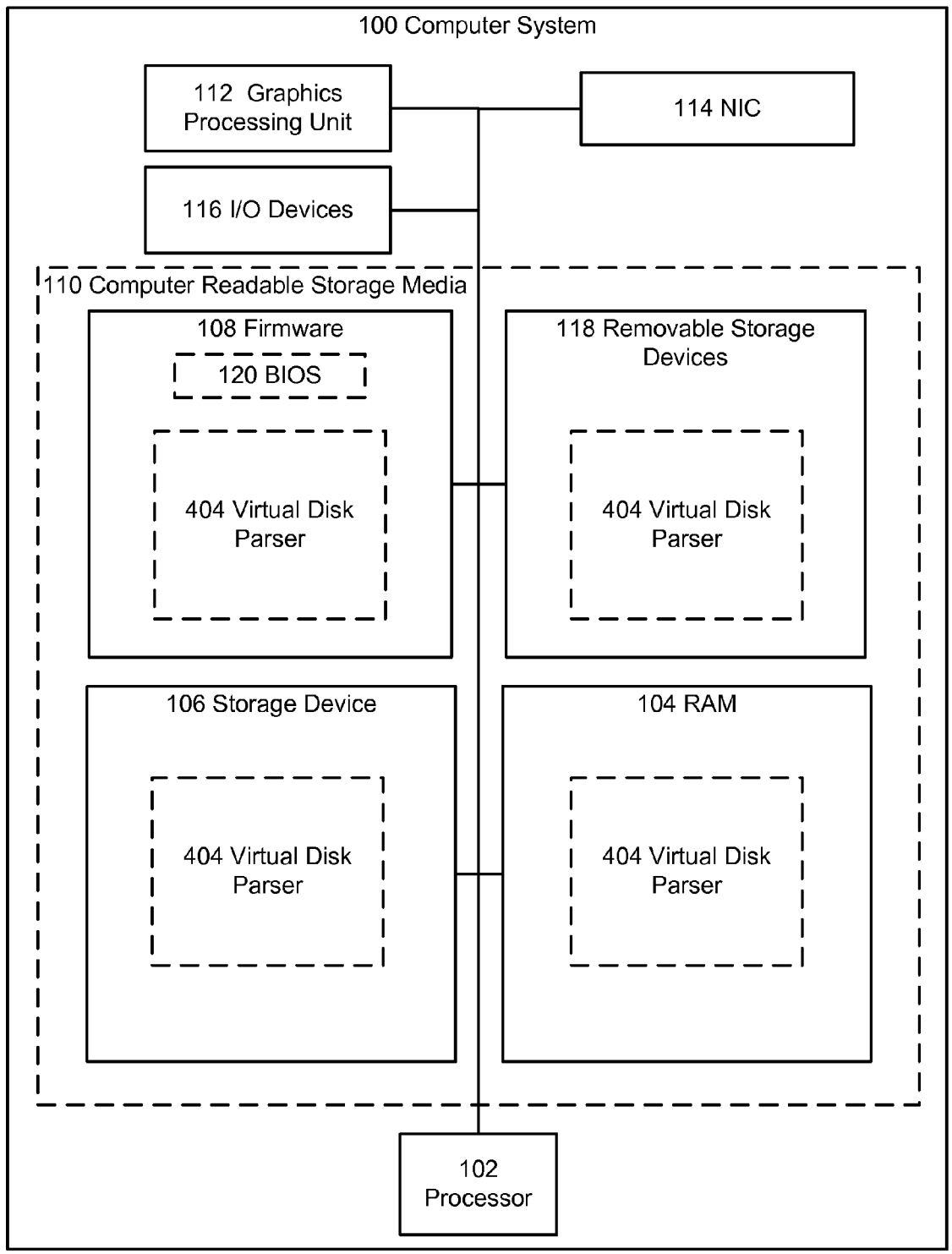
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs. In exemplary embodiments, computer-readable storage media 110 can store virtual disk parser 404, which is described in more detail in the following paragraphs, can be executed by processor 102 thereby transforming computer system 100 into a computer system configured for a specific purpose, i.e., a computer system configured according to techniques described in this document.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
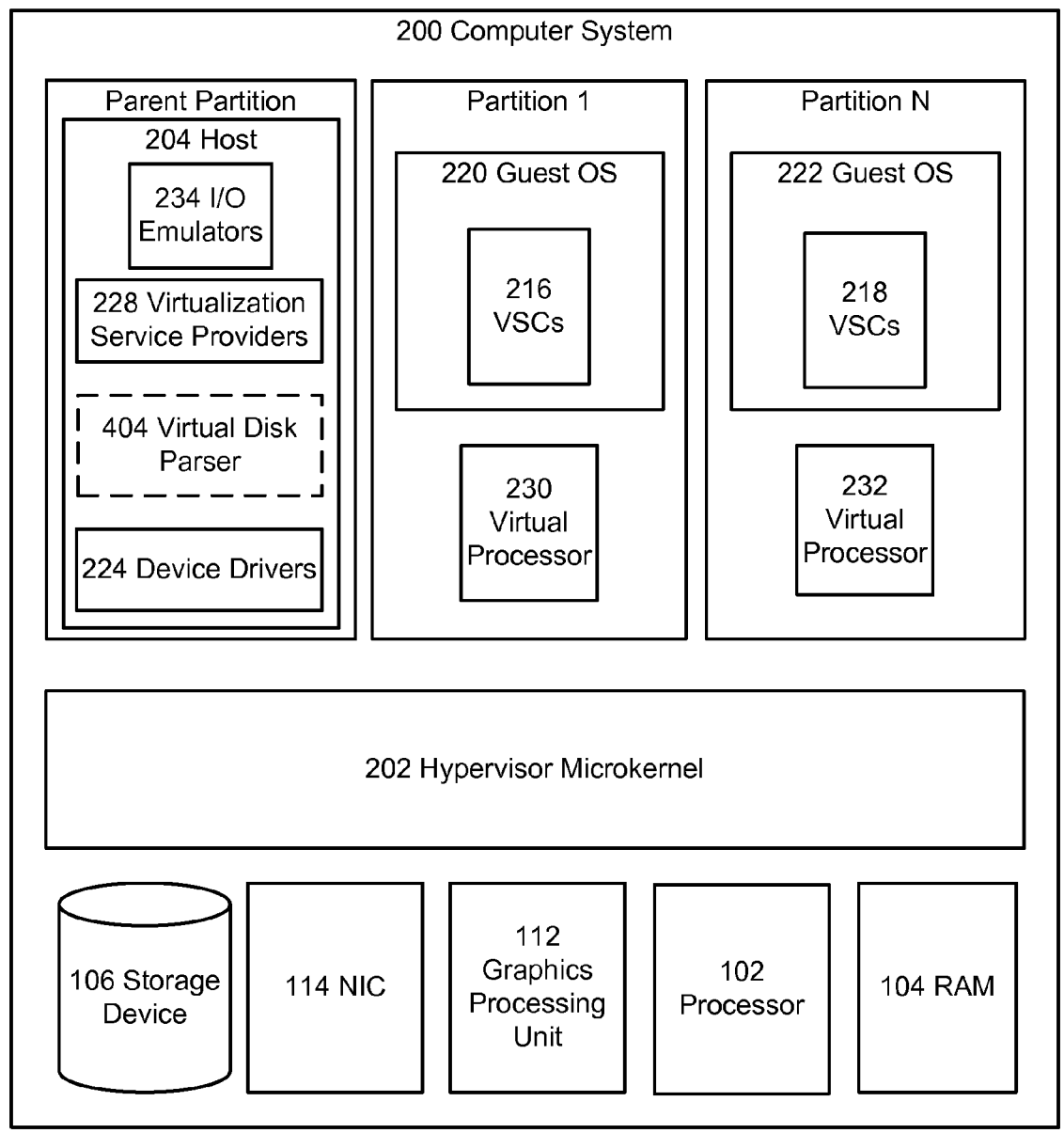
FIG. 2 depicts a high-level block diagram of an exemplary architecture for a virtualizing software program.
Figure 3:
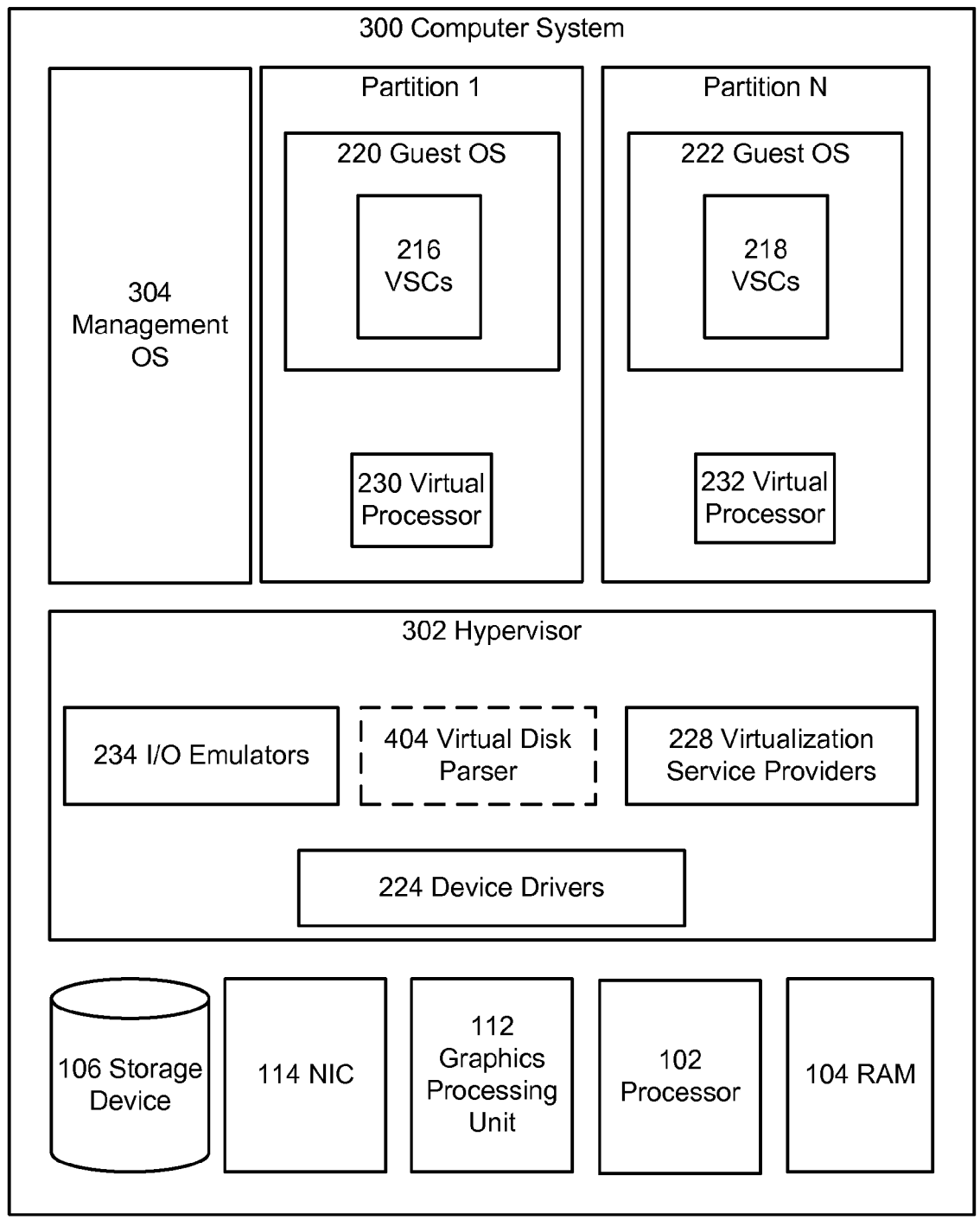
FIG. 3 depicts a high-level block diagram of an alternative architecture for a virtualizing software program.

Turning to FIG. 2 and FIG. 3, illustrated are exemplary virtualization platforms that can be used to generate the virtual machines used for virtual desktop sessions. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, hypervisor microkernel 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring now to FIG. 3, it depicts similar components to those of FIG. 2; however, in this example embodiment, hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2 and host 204. Hypervisor 302 of FIG. 3 can be a stand alone software product, a part of an operating system, embedded within firmware of a motherboard, and/or a portion of hypervisor 302 can be effectuated by specialized integrated circuits.

Figure 4:
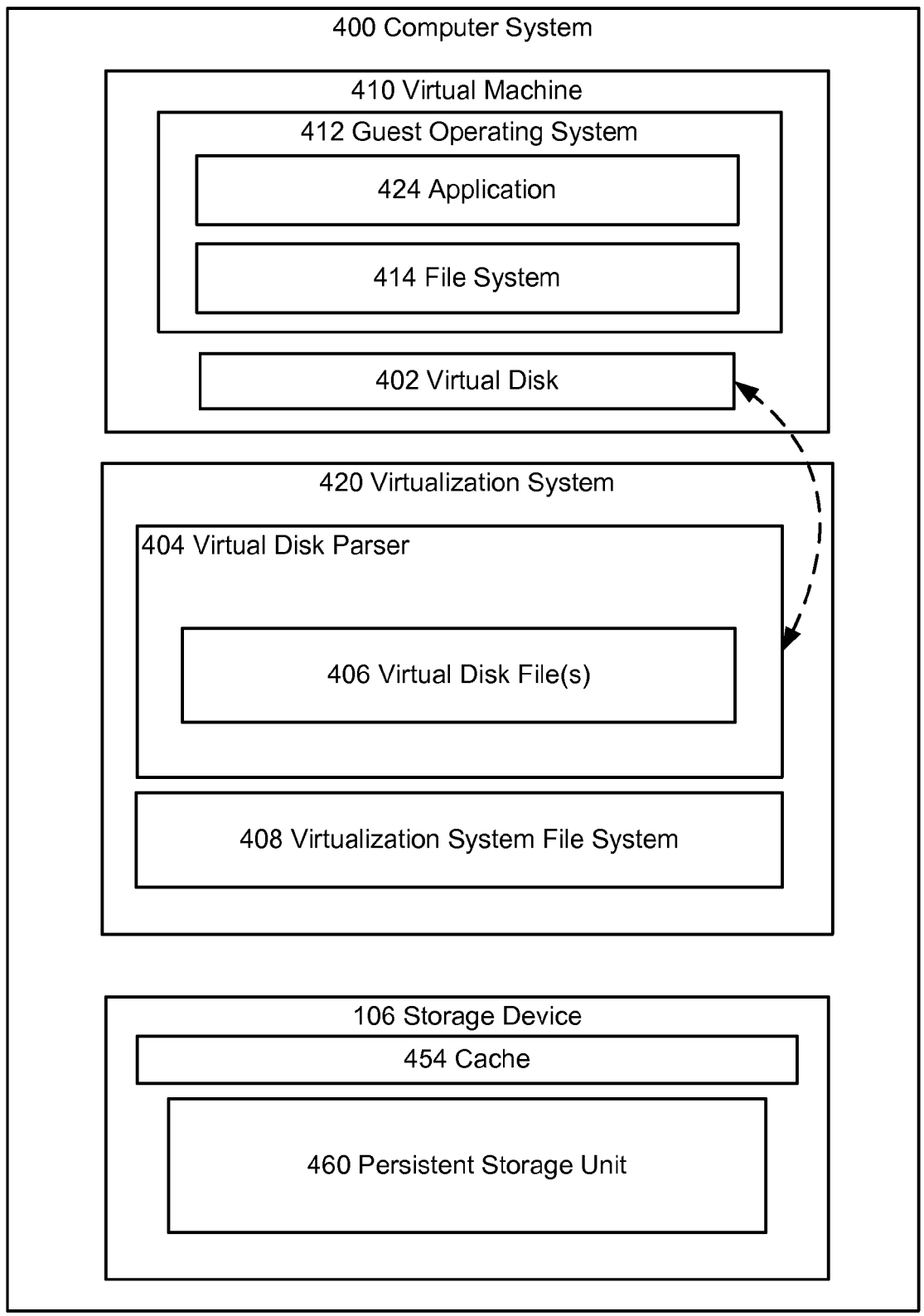
FIG. 4 depicts a lower-level block diagram of a computer system configured to effectuate a virtual disk.

Turning now to FIG. 4, it describes computer system 400, which illustrates a high-level block diagram of components that can be used to effect the techniques described in this document. Briefly, computer system 400 can include components similar to those described above with respect to FIG. 1 through 3. FIG. 4 shows virtualization system 420, which can be thought of as a high-level representation of the virtualization platform illustrated by FIG. 2 or FIG. 3. For example, virtualization system 420 can be though of as a high-level representation of the combination of features provided by hypervisor microkernel 202 and host environment 204. Alternatively, virtualization system 420 can be thought of as a high-level representation of hypervisor 302 and management OS 304. Thus, use of the term "virtualization system 420" throughout this document signals that the virtual disk techniques described in the following paragraphs can be implemented within any type of virtualization software layer or in any type of virtualization platform.

Virtual disk parser 404, which can be executable instructions in a specific example embodiment, can be used to instantiate virtual disks from virtual disk files and handle storage IO on behalf of a virtual machine. As shown by the figure, virtual disk parser 404 can open one or more virtual disk files such as virtual disk file(s) 406 and generate virtual disk 402

Virtual disk parser 404 can obtain virtual disk file(s) 406 from storage device 106 via virtualization system file system 408. Briefly, virtualization system file system 408 represents executable instructions that organize computer files and data of virtualization system 420, such as virtual disk file(s) 406. Virtualization system file system 408 can store this data in an array of fixed-size physical extents, i.e., contiguous areas of storage on a physical storage device. In a specific example, an extent can be a cluster, which is a sequence of bytes of bits having a set length. Exemplary cluster sizes are typically a power of 2 between 512 bytes and 64 kilobytes. In a specific configuration, a cluster size can be 4 kilobytes.

When a request to open virtual disk file 406 is received, virtualization system file system 408 determines where the file is located on disk and issues an IO job to the disk device driver to read the data from one or more physical extents of the disk. The IO job issued by file system 408 determines a disk offset and length that describes the location of the persistent copy of virtual disk file 406 on storage device 106 and issues the IO job to storage device 106. Due to the semantics of how storage devices operate, a write IO job can be buffered in one or more levels of caches of volatile memory, represented by cache 454, until the circuitry of storage device 106 determines to access the location on the persistent storage unit 460, e.g., a platter, a flash memory cell, etc., and write the buffered bit pattern indicative of the new contents of the persistent copy of the virtual disk file(s) 406 to persistent storage unit 460.

Virtual disk parser 404 can obtain the bit pattern indicative of virtual disk file(s) 406 and expose the payload, e.g., user data, in the virtual disk file(s) 406 as a disk including a plurality of virtual disk extents. In an embodiment, these virtual disk extents can be a fixed-size block 512 kilobytes up to 64 megabytes in size and partitioned into a plurality of sectors; however, in another embodiment the virtual disk extents could be variable-sized extents. In an exemplary configuration, prior to booting guest operating system 412, resources related to an emulated or enlightened storage controller and emulated or enlightened aspects of a virtual disk are setup such that an emulated storage controller with memory mapped registers is effected within guest physical address space of the virtual machine 410. Boot code can run and boot guest operating system 412. Virtualization system 420 can detect an attempt to access this region of guest physical address space and return a result that causes guest operating system 412 to determine that a storage device is attached to the emulated storage controller. In response, guest operating system 412 can load a driver (either a paravirtualization driver or a regular driver) and use the driver to issue storage IO requests to the detected storage device. Virtualization system 420 can route the storage IO requests to virtual disk parser 404.

After guest operating system 412 is running it can issue IO jobs to virtual disk 402 via file system 414, which is similar to virtualization system file system 414 in that it organizes computer files and data of guest operating system 412 and applications installed on guest operating system 412. Guest operating system 412 can interact with virtual disk 402 in a way that is similar to how an operating system interacts with a physical storage device and eventually the IO jobs are routed to virtual disk parser 404. Virtual disk parser 404 can include logic for determining how to respond to the IO jobs in a way that emulates a physical storage device. For example, virtual disk parser 404 can read data from virtual disk file(s) 406 and write data to virtual disk file(s) 406. The data written to virtual disk file(s) 406 in turn is routed through virtualization system file system 408 and committed to a persistent copy of virtual disk file(s) 406 stored on or in persistent storage unit 460.

Figure 5A:
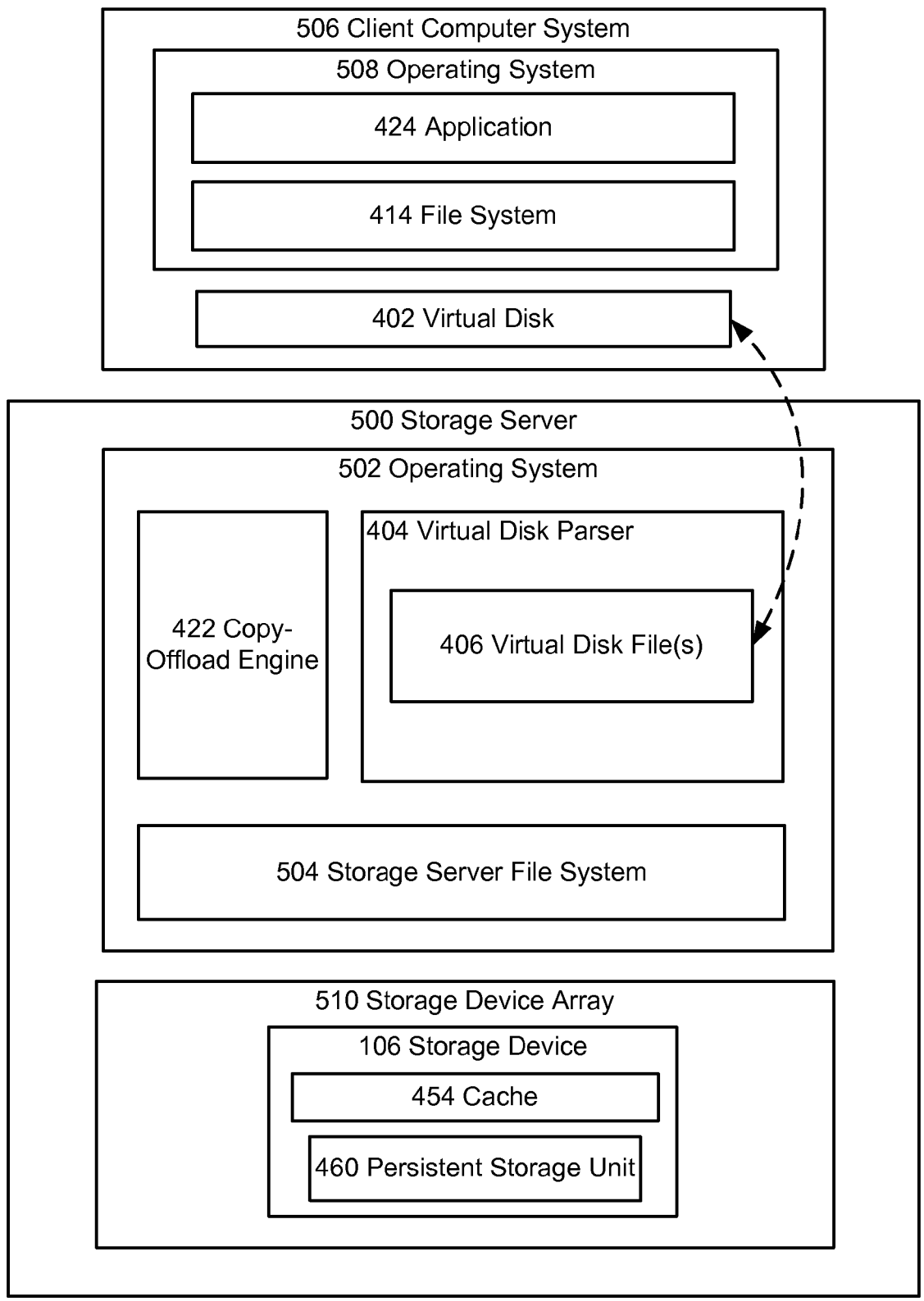
FIG. 5A depicts an alternative lower-level block diagram of a computer system configured to effectuate a virtual disk.

Referring briefly to FIG. 5A, it illustrates an alternative architecture for implementing techniques described in this document. As shown by FIG. 5, virtual disk parser 404 can also be implemented in an operating system 502 such as an operating system offered by Microsoft®. In this example, virtual disk parser 404 can be configured to run on storage server 500, which could include components similar to computer system 100 of FIG. 1. In this example, storage server 500 could include an array of physical storage devices 510 and can be configured to make storage available to servers such that the storage appears as locally attached to operating system 508. Virtual disk parser 404 can operate the same as it was described with respect to FIG. 4; the difference being in this configuration read/write IO jobs issued by file system 414 can be routed over a network connection to virtual disk parser 404.

Figure 5B:
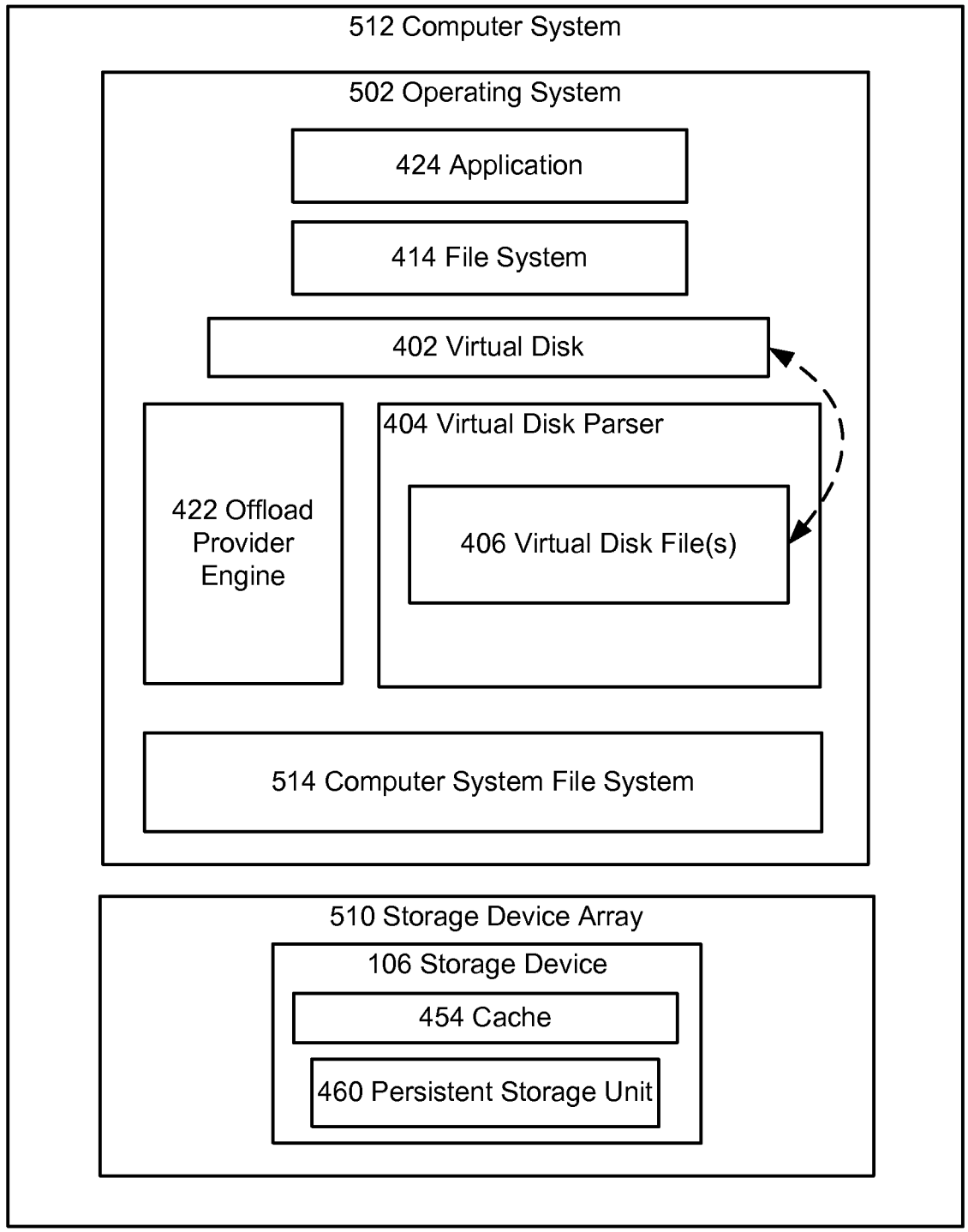
FIG. 5B another alternative lower-level block diagram of a computer system configured to effectuate a virtual disk.

Referring briefly to FIG. 5B, it illustrates yet another architecture for implementing techniques described in this document. FIG. 5B is similar to FIG. 5A in that virtual disk parser 404 is implemented in operating system 502 and computer system 512 could include components similar to computer system 100 of FIG. 1. The difference in this example; however, is that the figure illustrates a loopback-attached virtual disk 402. File system 414, including applications such as application 424 can be stored in virtual disk 402 and virtual disk file(s) 406 can be stored in computer system file system 514.

Figure 6:
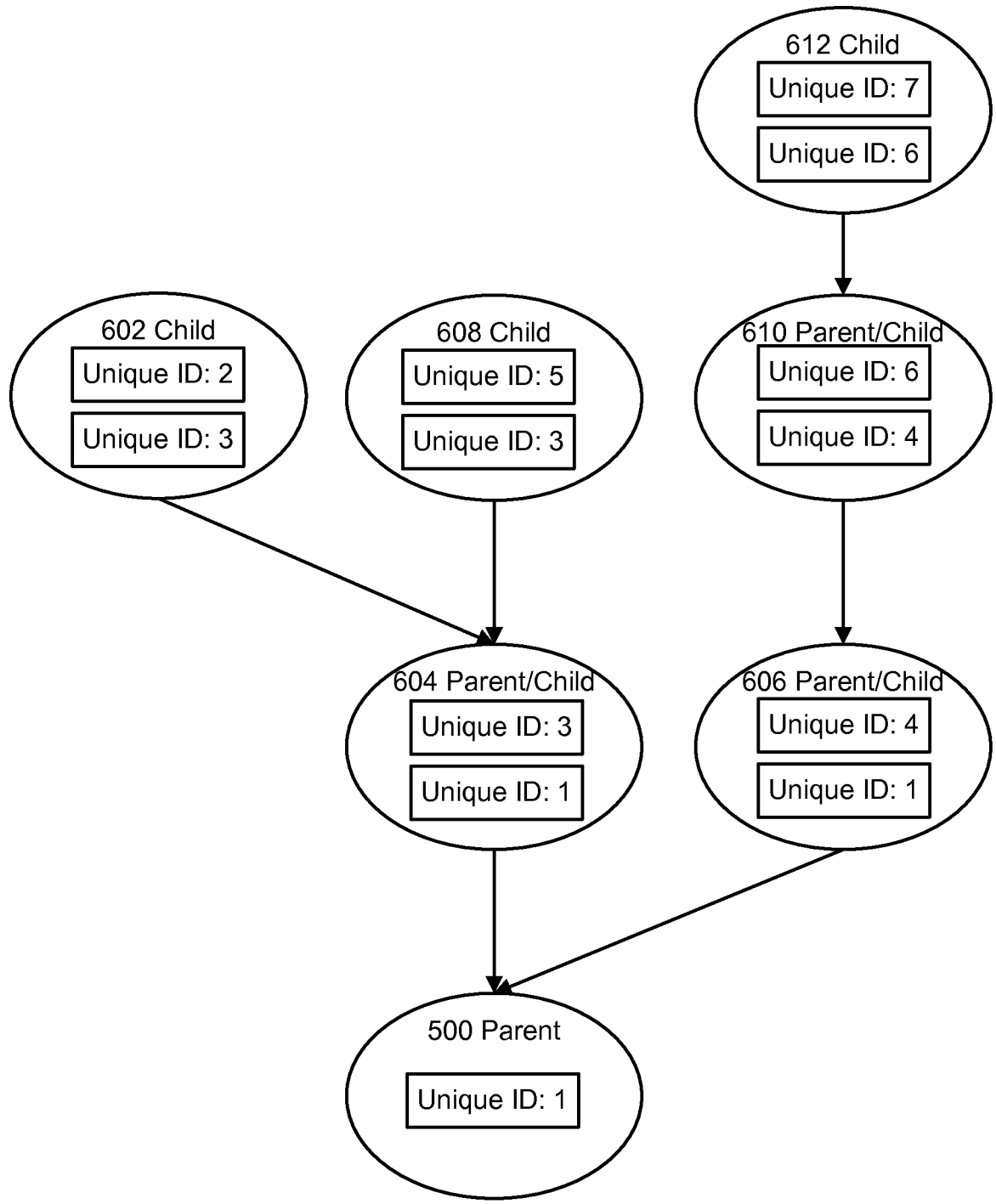
FIG. 6 depicts a high-level illustration of differencing virtual disk files.

Turning attention now to virtual disk 402, while it can be effected by a single virtual disk file, in other configurations a group of differencing virtual disk files can be used to bring about virtual disk 402. FIG. 6 illustrates exemplary chains of virtual disk files that can be used by virtual disk parser 404 to effect virtual disk 402 as a differencing disk. Generally, a differencing virtual disk file represents the current state of a virtual disk as a set of modified extents in comparison to a parent image. The parent image can be another differencing virtual disk file or a base virtual disk file.

In an exemplary configuration, the linking between a parent virtual disk file and a child virtual disk file can be stored within the child. In particular, the child can include an identifier of the parent and a value that describes the location of the parent. When starting a virtual machine, virtual disk parser 404 may receive information that describes the last virtual disk file in the chain, i.e., virtual disk file 612 is the last in a chain that includes virtual disk files 612, 610, 606, and 500, and open this file. This file can include an identifier of its parent, i.e., virtual disk file 610, and a path to it. Virtual disk parser 404 can locate and open the parent and so on and so forth until a base virtual disk file is located and opened.

Virtual disk parser 404 can use information that indicates whether data is present or stored in a parent virtual disk file. Typically, the last virtual disk file in the chain is opened as read/modify and other virtual disk files are opened as read only. Thus, writes are typically made to the last virtual disk file in the chain. Read operations are similarly directed first to the last virtual disk file in the chain and virtual disk parser 404 will logically search the virtual disk files in logical order from last to base until the data is found in the instance that information about where the data is located is not cached. In a specific example, an allocation table (not shown) for a virtual disk file, e.g., virtual disk file 612, can include state information that indicates whether the virtual disk extent is defined by a section of the virtual disk file or if this virtual disk extent is transparent, e.g., defined by a different virtual disk file further along the chain. In one implementation, virtual disk parser 404 can determine whether this virtual disk extent is transparent and access the allocation table for the next virtual disk file in the chain, e.g., virtual disk file 610, and so on and so forth until a virtual disk file in the chain is located that defines the data.

A problem exists in that a user may intentionally or inadvertently open a virtual disk file that is a parent and modify data that affects the user payload. This in turn could affect any virtual disk that uses this file as part of a chain and could cause the virtual disks to become unusable. For example, suppose a user opens up virtual disk file 610 and applied a patch or debugged it. Child virtual disk file 612 in this example may be reliant on data in virtual disk file 610 that is now moved or gone. When the allocation table for child virtual disk file 612 directs virtual disk parser 404 read from virtual disk file 610 the virtual disk parser 404 may return the wrong data and cause the guest operating system described by the combination of virtual disk files 500, 606, 610, and 612 to become unusable.

In an exemplary embodiment, a unique identifier can be inserted into each virtual disk file when it is created. When a child virtual disk file is created, a copy of the unique identifier of its parent at the time of the child's creation can also be inserted into the child. Thus, when virtual disk file 604 was created, it was given a unique identifier (unique identifier 3) and the unique identifier of its parent (unique identifier 1) was also inserted within virtual disk file 604.

In an exemplary embodiment, virtual disk parser 404 can be configured to change the unique identifier of a virtual disk file in the instance that a write to the virtual disk file would change a virtual disk extent and/or the size of a virtual disk. For example, changes to the user payload, an end of disk identifier, or entries within the allocation table that cause read operations to be directed to different sections are examples that could cause virtual disk parser 404 change the unique identifier. When virtual disk parser 404 opens a chain of virtual disk files, it can be configured to compare the unique identifier of a virtual disk file's parent to the unique identifier stored in the child. A difference reflects that a modification was made to the parent that affects a virtual disk extent and/or the size of a virtual disk.

Figure 7:
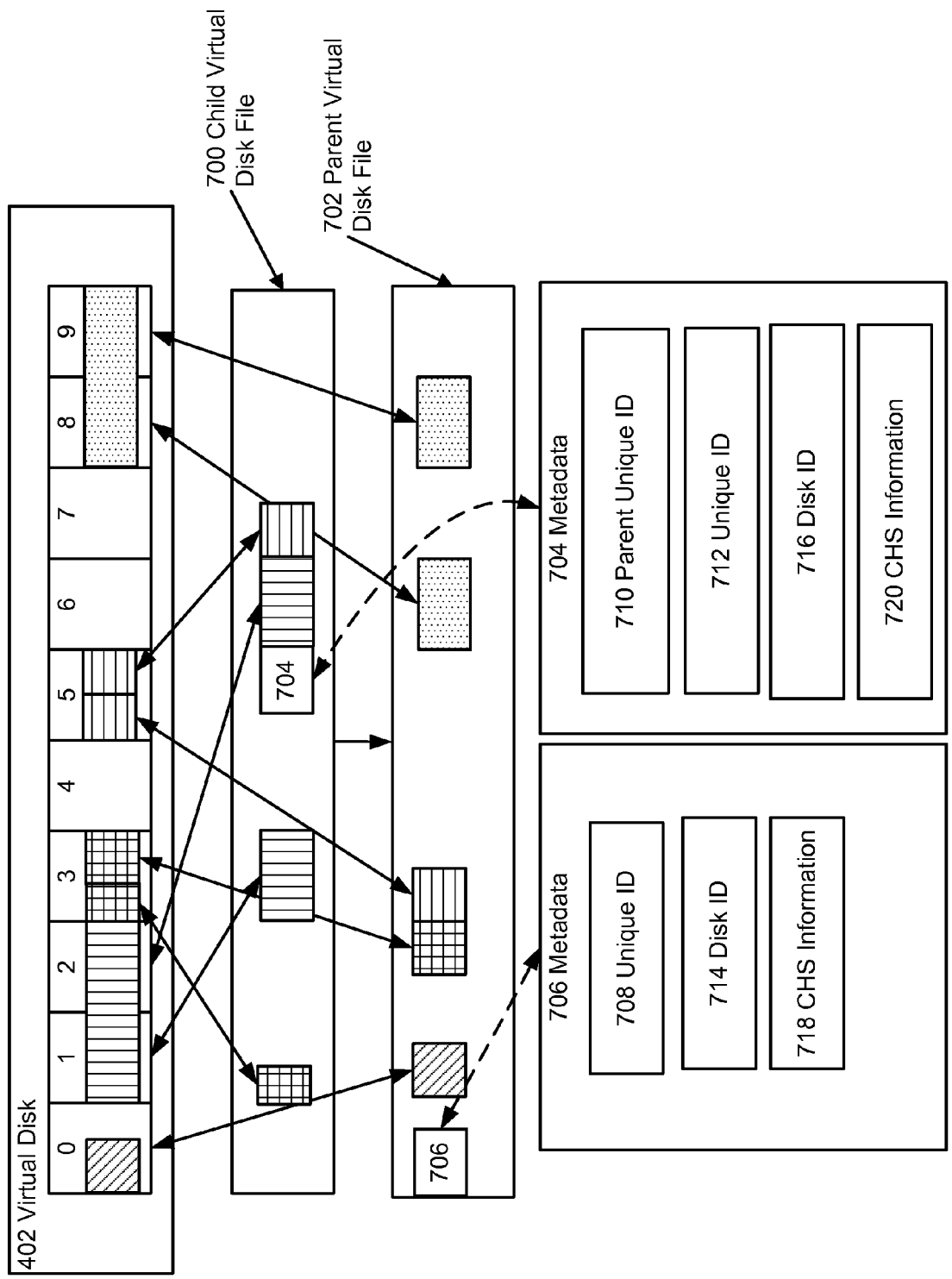
FIG. 7 depicts the relationship between a virtual disk and a virtual disk file.

Turning now to FIG. 7, this figure illustrates the relationship between virtual disk file 402 and the one or more virtual disk files that form virtual disk 402. In this example, two virtual disk files (700 and 702) are illustrated; however, this illustrated example is not limiting and many more virtual disk files can be used to effect virtual disk 402. As shown by FIG. 7, each virtual disk file can include metadata 704 and 706. Metadata 706, which is for virtual disk file 702, can include a unique identifier stored as unique identifier 708. Metadata 704, which is for virtual disk file 700, can include a copy of the unique identifier for virtual disk file 702 stored as parent unique ID 710 and its own unique identifier stored as unique ID 712. In an exemplary embodiment, if parent virtual disk file 702 was opened and written to in a way that caused the payload of a virtual disk extent and/or the size of the virtual disk to change, virtual disk parser 404 can change the identifier stored as unique identifier 708 to new unique identifier. If virtual disk parser 404 subsequently compares the identifier stored as parent unique identifier 710 to the identifier stored as unique identifier 708 the two wont match and a determination can be made that virtual disk 402 could be corrupted.

As an aside, metadata 706 and 704 can also include an identifier stored as disk identifier (714 and 716), which can be a value that can be returned to guest operating system 412 as the identifier of virtual disk 402 in a page # 83 request or the like. When a child virtual disk file is created, a copy of the value stored as disk identifier of the parent can be copied into the child or a new disk identifier can be assigned. The disk identifier can be used by guest operating system 412 to identify the virtual disk and is discussed to differentiate it from the unique identifier. In addition to a disk identifier, cylinder, head, and sector legacy information (CHS information 718 and 720) can also be stored in metadata 706 and 704. The CHS information can be used to translate IO jobs express IO in terms of cylinder, head, and sector values to an IO job expressed as an offset.

Continuing with the general overview of FIG. 7, it shows that virtual disk 402 can include N extents of storage (where N is an integer greater than 1) and in this specific example virtual disk 402 includes 10 extents. Virtual disk 402 is illustrated as including the bit patterns for different files and data for guest operating system 412, which are differentiated by the different patterns within the virtual disk extents.

Since virtual disk 402 is not a physical storage device, the underlying payload data for the virtual disk extents can be "described by," i.e., stored in, different sections within virtual disk file 702 and 700. Allocation table 416, which can be stored in random access memory while computer system 400 is in operation, can be persisted in virtual disk file 702 in any section and can span multiple sections. Briefly, each virtual disk file can be associated with an allocation table (not shown), which can include information that links virtual disk extents to sections of virtual disk file 702 or 700.

Each virtual disk extent can be associated with a sector bitmap. In an exemplary configuration, a sector bitmap for a virtual disk extent can be stored at the beginning of the section of the virtual disk file used to describe the virtual disk extent. In an alternative configuration, and described in more detail in the paragraphs that describe FIG. 9, sector bitmaps for a plurality of virtual disk extents can be aggregated and stored in a composite sector bitmap. A sector bitmap can include one byte for each sector in the corresponding virtual disk extent. Thus, if an extent is 2 megabytes and each sector is 4 kilobytes, then each virtual disk extent includes 512 sectors and each sector bitmap would include 512 bytes. A one signifies that the sector is described by child virtual disk file 700 and a 0 indicates that the sector is described by another virtual disk file, such as a parent.

Since accessing sector bitmaps from disk can negatively affect performance, in an embodiment virtual disk parser 404 can be configured to generate a normalized bitmap. The normalized bitmap can include a byte for each virtual disk extent that is fully described. The bit can be set to 1 if every sector of the virtual disk extent is present and 0 if any sectors within the virtual disk extent are transparent. Thus, virtual disk parser 404 can first check the normalized bitmap to determine whether the sector bitmap needs to be checked. If the entry within the normalized bitmap is a 1, then the sector bitmap does not need to be consulted.

Figure 8:
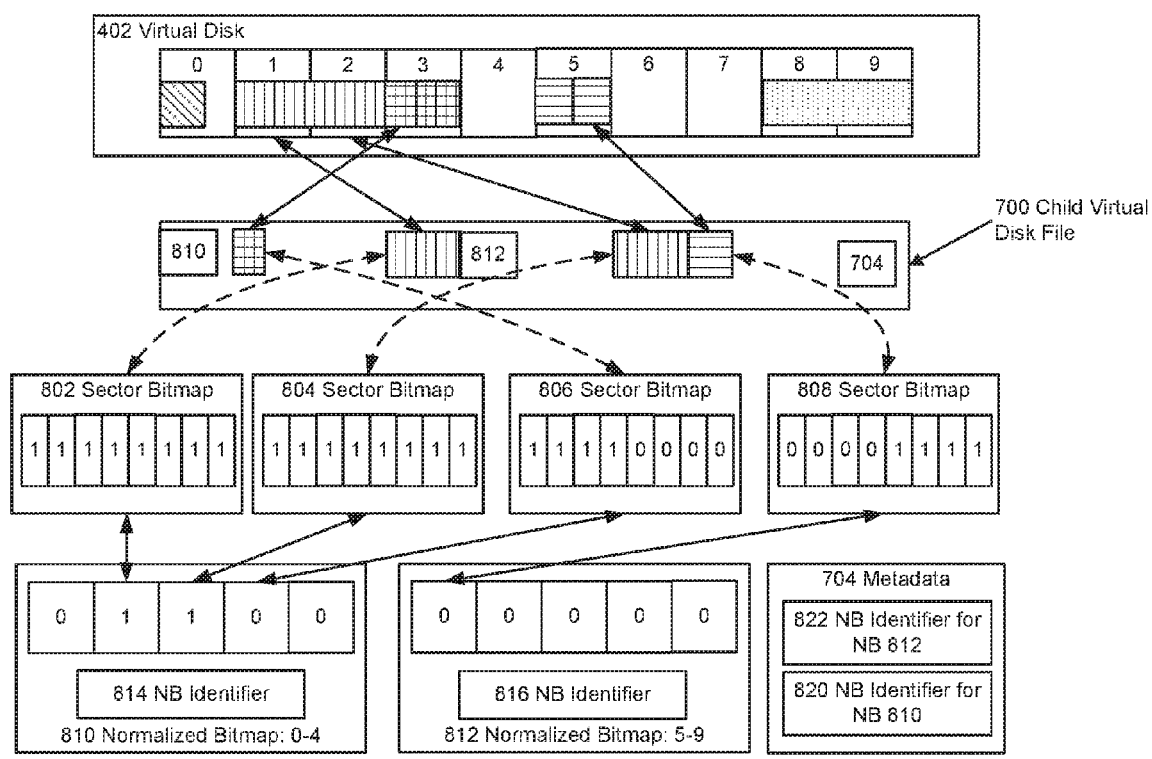
FIG. 8 depicts the relationship between a normalized bitmap and sector bitmaps.

For example and turning to FIG. 8, it shows a specific example of how sector bitmaps can be generated for each virtual disk extent and used to generate normalized bitmaps. FIG. 8 shows four sector bitmap tables 802, 804, 806, and 808 and each sector bitmaps can include a bit for each sector in a virtual disk extent. The sector bitmaps illustrated by FIG. 8 include 8 bits (and each virtual disk extent includes 8 sectors) to illustrate the techniques described by this document and are not to scale. Normalized bitmaps 810 and 812 show that each virtual disk extent that is fully described can be marked with a 1. For example, normalized bitmap 810 includes a bit for virtual disk extent 1 and virtual disk extent 2, which indicate that these virtual disk extents are fully described by child virtual disk file 700.

A problem exists in that not all virtual disk parsers may be configured to use normalized bitmaps and these normalized bitmaps may not be not persisted. To overcome this limitation, in an exemplary embodiment, virtual disk parser 404 can be configured to store the normalized bitmaps in virtual disk files; however, since not all virtual disk parsers understand them or use them and a virtual disk parser may overwrite, delete or otherwise invalidate the bit patterns indicative of the normalized bitmaps stored in virtual disk file 406, virtual disk parser 404 can be configured to authenticate them before using them.

In an exemplary embodiment, these normalized bitmaps can be persisted by virtual disk parser 404 and virtual disk parser 404 can be configured to authenticate them when booting virtual disks. In an embodiment, each normalized bitmap can be assigned a normalized bitmap identifier (NB ID), e.g. a random value, a sequence number, a timestamp, etc., which can be stored in metadata 704. As shown by the figure, metadata 704 includes an identifier stored as NB ID 820 and an identifier stored as NB ID 822. In addition, a copy of the identifier can also be stored in association with each normalized bitmap in the instance that the state of the normalized bitmap accurately describes the sector bitmaps associated with it. For example, normalized bitmap 810 is shown as including an identifier stored as NB ID 814 and normalized bitmap 812 is shown as including NB ID 816. While the figure indicates that the NB ID is stored within its respective normalized bitmap, it does not have to be stored in this way. Rather, it can be stored anywhere within virtual disk file 700 such as in the BAT.

When virtual disk parser 404 opens a virtual disk file it can use the NB ID to determine whether the associated normalized bitmap is valid and can be used. In this way, virtual disk parsers that are configured to use normalized bitmaps can determine whether the normalized bitmaps are valid and the virtual disk files can still be used by virtual disk parsers that do not use normalized bitmaps. For example, the fact that these two identifiers match indicates that normalized bitmap is valid and can be used without having to regenerate it.

After virtual disk parser 404 opens a virtual disk file in write/modify mode, (or when the first write is detected) virtual disk parser 404 can be configured to change the identifiers stored in the metadata to new identifiers, e.g., it could increment a sequence number, and issue an IO job indicative of the update to storage device 106 so that the change to the identifier can be persisted. In the instance that the normalized bitmaps accurately reflect the state of the sector bitmaps they describe, the identifiers stored in association with the normalized bitmaps can also be updated to match the metadata. In the instance that the identifiers do not match, virtual disk parser 404 can rebuild the normalized bitmaps.

Figure 9:
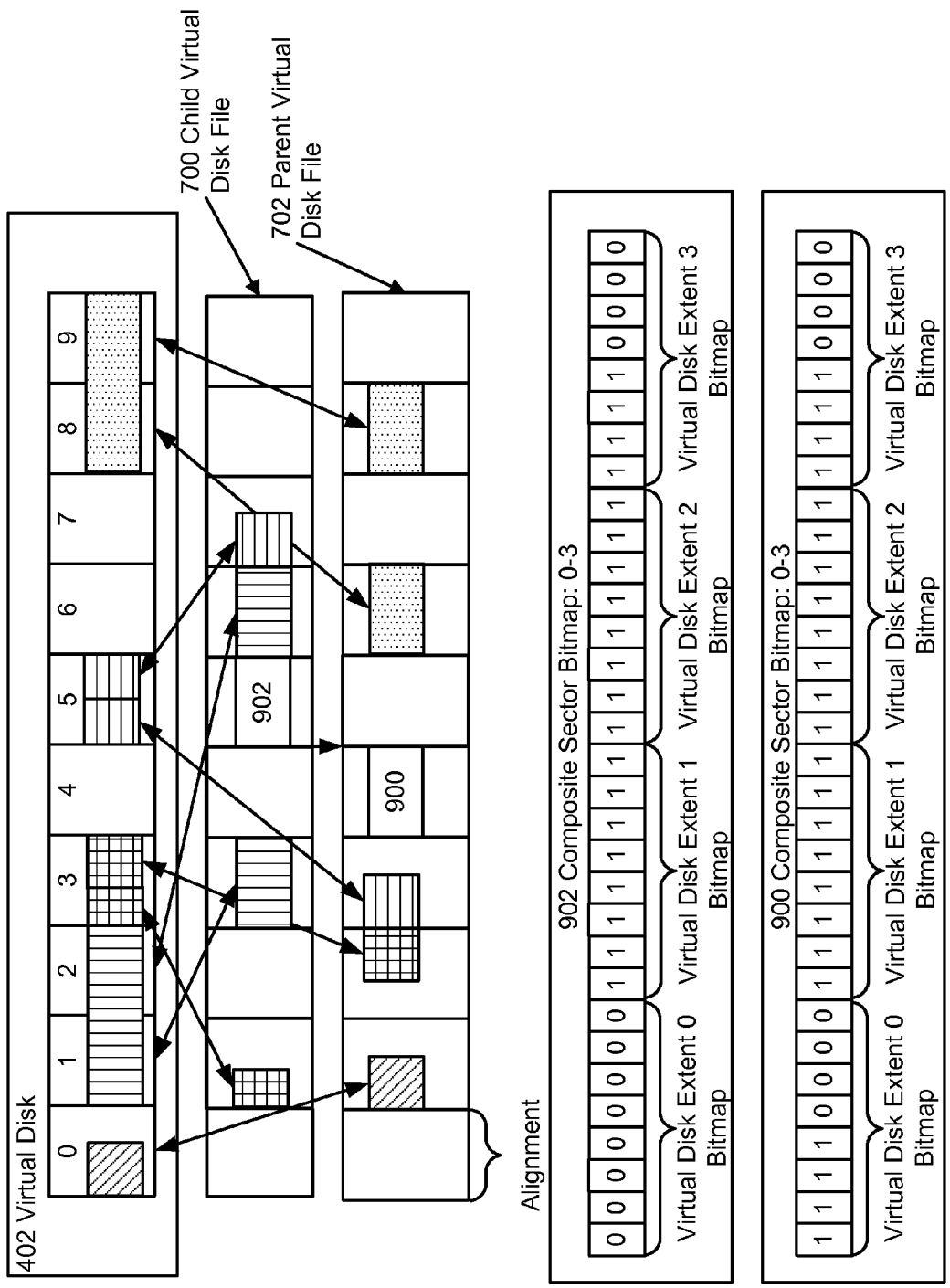
FIG. 9 depicts the relationship between virtual disk files and a composite sector bitmap.

Turning now to FIG. 9, it shows that in an exemplary embodiment, sector bitmaps for a plurality of virtual disk extents of a virtual disk file can be aggregated and stored in a composite sector bitmap. For example, composite sector bitmap 900 includes the sector bitmaps for virtual disk extents 0-3 of virtual disk file 702 and composite sector bitmap 902 includes the sector bitmaps for virtual disk extents 0-3 of virtual disk file 700. As an aside, normalized bitmaps can be generated for composite sector bitmaps using the same technique described above. The difference being that the data used to construct the normalized bitmaps is aggregated.

In an exemplary embodiment, composite sector bitmaps 900 and 902 can be used to remove sector bitmaps from the beginning of the section used to store a payload for a virtual disk extent. This has the effect of aligning the payload with the sector size of the underlying storage device. In addition, the number of sector bitmaps used to form composite sector bitmap 900 and/or 902 can be selected such that it is at least equal to a multiple of the sector size used by the underlying storage device.

The arrangement shown by FIG. 9 is exemplary and not to scale. Rather, FIG. 9 is used to illustrate the concept of aggregating sector bitmaps for virtual disk extents and storing them in a composite sector bitmap. In a specific example, suppose that a virtual disk extent is 2 mb in size and each sector is 4 kb. This means that each virtual disk extent includes 512 sectors and a sector bitmap for the virtual disk extent can be 512 bytes. In the instance where the composite sector bitmap is configured to span 1 megabyte, the composite sector bitmap can be used to describe 2048 virtual disk file extents. The size of the composite sector bitmap can be selected to be aligned with the underlying storage device and the virtual disk extent.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 10:
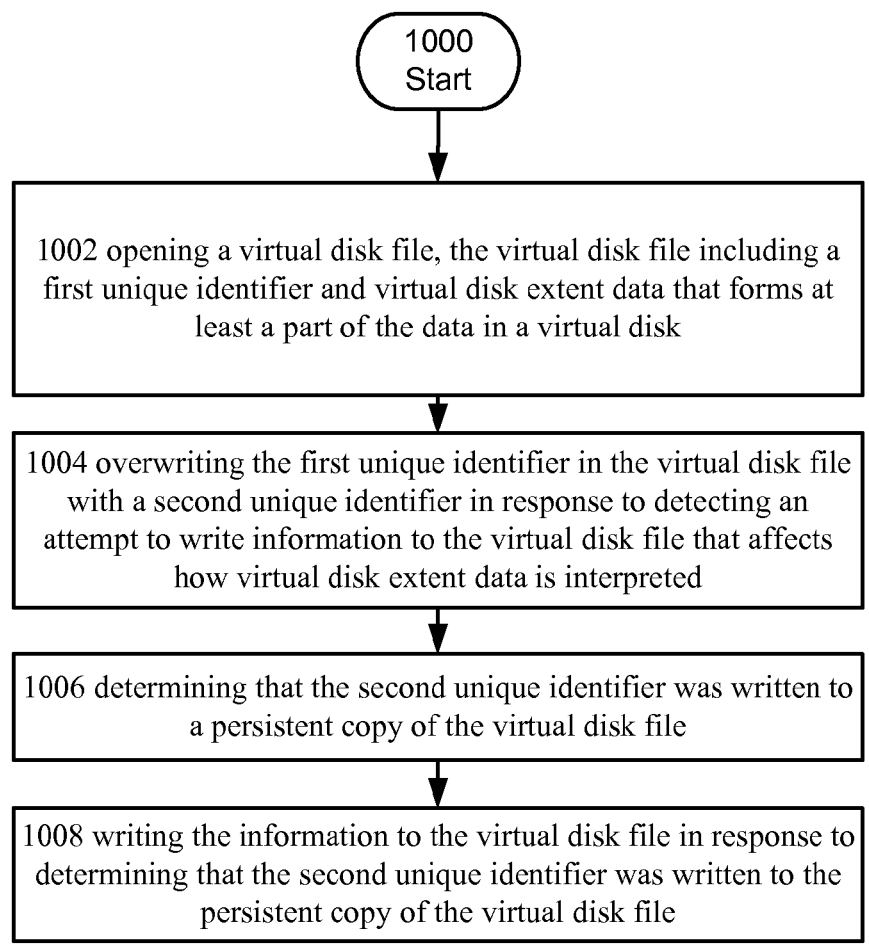
FIG. 10 depicts an operational procedure that can be embodied within a computer-readable storage medium and/or executed by a computer system.

Turning now to FIG. 10, it illustrates an operational procedure that can be executed by a computer system, such as computer system 400 of FIG. 4. Operation 1000 begins the operational procedure and operation 1002 indicates that computer system 400 can include circuitry configured to open a virtual disk file, the virtual disk file including a unique identifier identifying the virtual disk file and virtual disk extent data that forms at least a part of the data in a virtual disk. For example, and turning to FIG. 4, computer system 400 can include virtual disk parser 404, which can be executable instructions. In an exemplary embodiment, virtual disk parser 404 can be executed by a processor such as processor 102 of FIG. 1 and issue a request to open a virtual disk file to virtualization system file system 408. In a specific instance, the request could be to open a virtual disk file that is a parent of another virtual disk file, e.g., virtual disk file 500, 604, 606, or 610 of FIG. 6. Here, a user may have decided to the open virtual disk file in order to modify some of the information stored therein. For example, suppose the user opened the virtual disk file as a virtual disk of a virtual machine in order to apply a patch and he or she may not know that another virtual disk file is dependent upon its contents. In another specific example, a user may have opened the virtual disk file as a text file to view the contents of the file. Turning to FIG. 7, in a specific example suppose the virtual disk file is parent virtual disk file 702. In this example, when virtual disk parser 404 opens parent virtual disk file 702, payload data for virtual disk extents and metadata 704 (including a first identifier stored as unique identifier 708) can be detected.

Referring back to FIG. 10, operation 1004 describes an operation that can be executed by computer system 400. In particular, computer system 400 in an exemplary embodiment can include circuitry for overwriting the first unique identifier in the virtual disk file with a second unique identifier in response to detecting an attempt to write information to the virtual disk file that affects how virtual disk extent data is interpreted. After opening a virtual disk file, virtual disk parser 404 can be executed by processor 102 and detect that a change has been made to data that will affect the payload it stores. Virtual disk parser 404 can include logic that can detect when it is directed to make a first modification that affects the payload and, prior to making the change, virtual disk parser 404 can issue one or more IO jobs to storage device 106 that change the first unique identifier stored as unique ID 708 to a second unique identifier.

For example, suppose a virtual disk is instantiated from the virtual disk file and a user attempts to defrag the virtual disk. Virtual disk parser 404 can receive one or more IO jobs that move data stored in a first virtual disk extent to a second virtual disk extent. In response to receipt of this IO job, virtual disk parser 404 can determine to change a relationship in an allocation table that causes the section of the virtual disk file used to describe the first virtual disk extent to be changed to describing the second virtual disk extent. Virtual disk parser 404 can determine whether virtual disk extent data it stores has been changed since it was opened by checking, for example, a bit in memory, a determine that the bit is not set, which could indicate that virtual disk extent data has not been changed. In response to this determination, virtual disk parser 404 can use a random value or a random alphanumeric value to generate a second value and issue one or more IO jobs to storage device 106 that change the first unique identifier stored as unique ID 708 to a second unique identifier.

Turning back to FIG. 10, operation 1006 shows that computer system 400 can optionally include circuitry for determining that the second unique identifier was written to a persistent copy of the virtual disk file. Referring back to FIG. 4 for context, computer system 400 can include circuitry, e.g., virtual disk parser 404 running on processor 102, that can determine that the second unique identifier was persisted to disk. For example, and continuing from the example in the previous paragraph, virtual disk parser 404 can issue a flush to storage device 106 after sending the one or more IO jobs to storage device 106. Storage device 106 can flush cache 454 to persistent storage unit 460 and the identifier stored as unique identifier 608 in the on-disk copy of virtual disk file 702 can be updated to the second unique identifier. The result of this operation is virtual disk parser 404 can determine that a virtual disk built from virtual disk file 702 and another virtual disk file may be corrupted.

Turning back to FIG. 10, operation 1008 shows that computer system 400 can additionally include circuitry for modifying the information to virtual disk file in response to determining that the second unique identifier was written to the persistent copy of the virtual disk file. Returning briefly to FIG. 4, virtual disk parser 404 can determine that the identifier stored as unique identifier 708 in the on-disk copy of virtual disk file 702 was updated to the second unique identifier and modify the information stored in virtual disk file 702. For example, virtual disk parser 404 can determine that the flush operation completed by receiving an acknowledgment from storage device 106. Alternatively, virtual disk parser 404 can determine that the flush operation completed because a failure message was not received. After the flush finishes, virtual disk parser 404 can make the modification to virtual disk file 702 and cause one or more IO jobs indicative of the modification to be sent to storage device 106.

Figure 11:
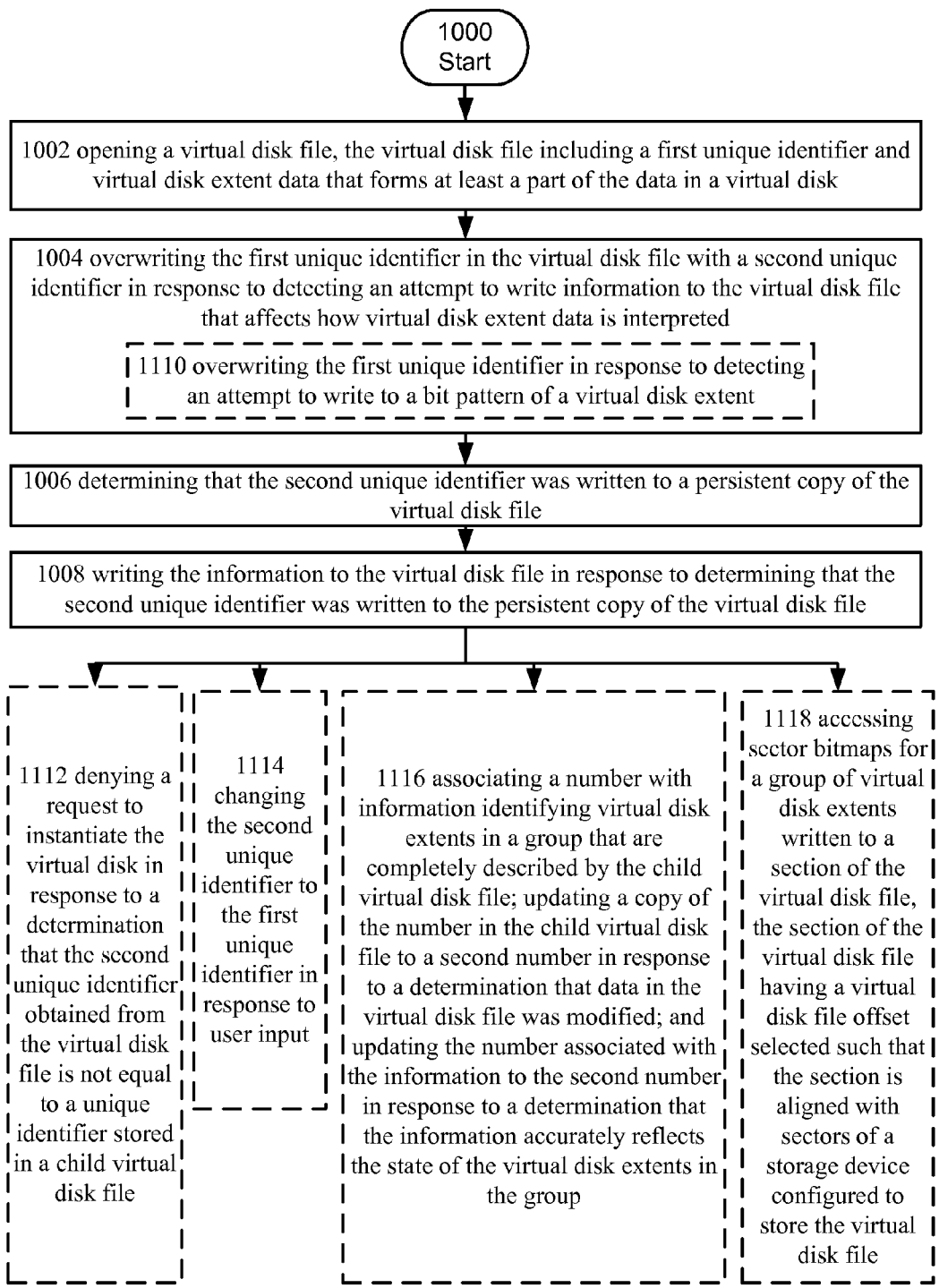
FIG. 11 depicts additional operations that can be executed in conjunction with those illustrated by FIG. 10.

Turning now to FIG. 11, it illustrates alternative operations that can be executed in conjunction with those depicted by FIG. 10. FIG. 11 shows operation 1110, which indicates that in an embodiment the circuitry configured to overwrite the first unique identifier can additionally be configured to overwrite the first unique identifier in response to detecting an attempt to write to a bit pattern of a virtual disk extent. For example, and turning briefly to FIG. 7, suppose a user instantiates virtual disk 402 from parent virtual disk file 702 and changes data that causes a bit pattern of a virtual disk extent to be changed. For example, suppose a user zeros out the contents of a file. Virtual disk parser 404 can receive IO jobs indicative of a request to write all zeros to a virtual disk extent and determine that this is the first modification to virtual disk file 702 since it was opened. In response to this determination, virtual disk parser 404 can issue one or more IO jobs to storage device 106 to overwrite the first identifier stored as unique identifier 708 with a second unique identifier.

Turning back to FIG. 11, operation 1112 shows that in an exemplary embodiment computer system 400 can optionally include circuitry configured to deny a request to instantiate the virtual disk in response to a determination that the second unique identifier obtained from the virtual disk file is not equal to a unique identifier stored in a child virtual disk file. For example, and turning back to FIG. 7, suppose that sometime later a user attempts to instantiate virtual disk 402 from both virtual disk file 700 and virtual disk file 702. In this example, virtual disk parser 404 can open child virtual disk file 700 and determine the path to parent virtual disk file 702 as well the identifier stored as parent unique identifier 710, which in this example is the first unique identifier. Virtual disk parser 404 can then locate parent virtual disk file 702; open it; and locate the identifier stored as unique identifier 708, which in this example is the second unique identifier. Virtual disk parser 404 can determine that the first identifier is not equal to the second identifier, which is indicative of the fact that parent virtual disk file 702 was modified, and deny the request to instantiate virtual disk 402. In a specific example, virtual disk parser 404 may cause a dialog box to be displayed that includes text that indicates that virtual disk 402 has been corrupted because modifications the base virtual disk file have made it invalid.

Turning back to FIG. 11, operation 1114 shows that in an exemplary embodiment computer system 400 can include circuitry configured to change the second unique identifier to the first unique identifier in response to user input. For example, and again turning back to FIG. 7, suppose that a user attempts to instantiate virtual disk 402. Rather than denying the request as described in the preceding paragraph, virtual disk parser 404 can cause a dialog box that includes an option that if selected directs virtual disk parser 404 to attempt to instantiate virtual disk 402 regardless of whether virtual disk 402 is corrupted or not. In the instance that virtual disk 402 is successfully opened, virtual disk parser 404 can copy the identifier stored as parent unique identifier 710, i.e., the first unique identifier, and overwrite the identifier stored as unique identifier 708, i.e., the second unique identifier, and indicate that a repair operation was successful.

Turning back to FIG. 11, operation 1116 shows that in an exemplary embodiment computer system 400 can include circuitry configured to associate a number with information identifying virtual disk extents in a group that are completely described by the child virtual disk file; circuitry configured to update a copy of the number in the child virtual disk file to a second number in response to a determination that data in the virtual disk file was modified; and circuitry configured to update the number associated with the information to the second number in response to a determination that the information accurately reflects the state of the virtual disk extents in the group. For example, suppose that virtual disk 402 is instantiated and virtual disk parser 404 loads a normalized bitmap into random access memory. Normalized bitmap can be associated with a normalized bitmap identifier, e.g., a random number, a sequence number, etc. In a specific example, suppose that the normalized bitmap is similar to normalized bitmap 810 of FIG. 8. As shown by the figure, normalized bitmap can be associated with an identifier stored as normalized bitmap identifier 814.

Virtual disk parser 404 can be configured in an exemplary embodiment to determine whether virtual disk file 700 has been modified and, in response to receipt of a request to change data within virtual disk file 700, e.g., metadata and/or payload data, virtual disk parser 404 can check an identifier in memory to see if this is the first modification since virtual disk file 700 has been opened. In this configuration, when the modification is the first one since virtual disk file 700 was opened, virtual disk parser 404 can change the identifier stored as NB identifier 820 to a second NB identifier by causing one or more IO jobs indicative of the change to be issued to storage device 106. In an alternative configuration, virtual disk parser 404 can change the identifier stored as NB identifier 720 to a second NB identifier by causing one or more IO jobs indicative of the change to be issued to storage device 106 as soon as virtual disk file 700 is opened in read/modify mode. At this point in time, the on-disk version of virtual disk file 700 includes different identifiers for normalized bitmap number 720 and normalized bitmap number 814, if virtual disk parser 404 crashes the next time virtual disk file 700 is opened by virtual disk parser 404 the numbers will not match. This indicates that normalized bitmap 810 may not accurately reflect the contents of the sector bitmaps it covers.

In the instance that virtual disk parser 404 is programmed to maintain normalized bitmaps, e.g., to update normalized bitmap 810 when the sector bitmaps for virtual disk extents 0-4 transition into the fully described state, virtual disk parser 404 can also be configured to change normalized bitmap identifier 814 to be equal to the persisted normalized bitmap identifier 820 and issue an IO job to storage device 106 to persist the change. As described in more detail above, the change to the identifier stored as normalized bitmap identifier 814 can be made when virtual disk parser 404 is closing child virtual disk file 700 or as soon as the change is made to persisted normalized bitmap number 820, in the instance that transactional logs or some other logging mechanism is used to ensure that changes made to the in memory version of normalized bitmap 810 are successfully committed to persistent storage unit 460.

Referring back to FIG. 11, operation 1118 illustrates that in an exemplary embodiment computer system 400 can include, but is not limited to, circuitry configured to access sector bitmaps for a group of virtual disk extents written to a section of the virtual disk file, the section of the virtual disk file having a virtual disk file offset selected such that the section is aligned with sectors of a storage device configured to store the virtual disk file. In an exemplary embodiment, an IO job can be received by virtual disk parser 404 that causes virtual disk parser 404 to access a section of virtual disk file 702 that stores composite sector bitmap 900. In this example, composite sector bitmap 900 was written to virtual disk file 702 so that it was aligned with the underlying sector size of storage device 106. This alignment improves the overall performance of virtual disk 402 because composite sector bitmap 900 and virtual disk extent payloads are aligned with storage device 106, therefore the chance of crossing a track boundary when reading from a disk-based storage device is reduced.

Figure 12:
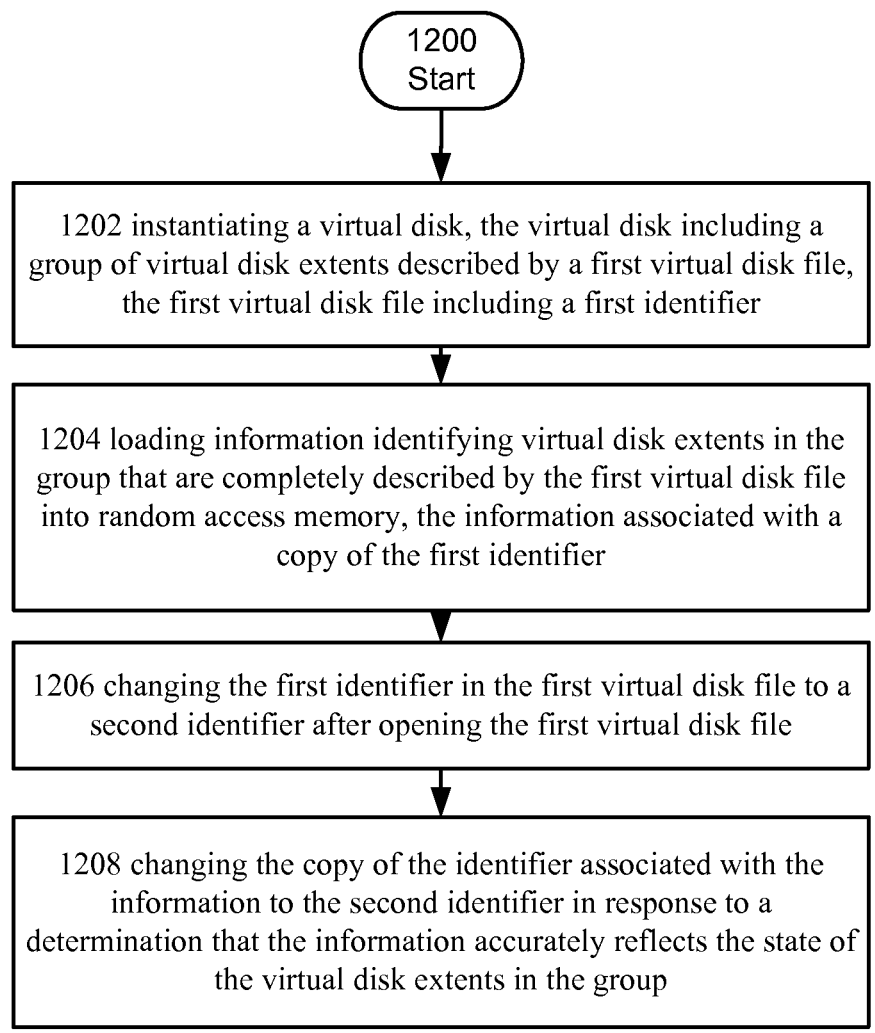
FIG. 12 depicts an operational procedure that can be embodied within a computer-readable storage medium and/or executed by a computer system.

Turning now to FIG. 12, it illustrates an operational procedure including the operations 1200, 1202, 1204, 1206, and 1208. Turning to operation 1200, it shows the start of the operational procedure and operation 1202 describes an operation that can be executed by circuitry of computer system 400; namely, instantiating a virtual disk, the virtual disk including a group of virtual disk extents described by a first virtual disk file, the first virtual disk file including a first identifier. For example, and referring to FIG. 4, suppose a user or a management program determines to start virtual machine 410. In response to receipt of such a signal, virtualization system 420 can start an operational process for instantiating virtual machine 410. One part of the process can be to signal virtual disk parser 404 to open up virtual disk files that together store the bit patterns that form guest operating system 412. Virtual disk parser 404 can determine to open, for example, child virtual disk file 700 and parent virtual disk file 702 and use them to instantiate virtual disk 402 of FIG. 7. As shown by FIG. 8, virtual disk file 700 can include metadata 804, which can include an identifier stored as normalized bitmap identifier 820.

Turning back to FIG. 12, operation 1204 demonstrates that computer system 400 can be configured to include circuitry for loading information identifying virtual disk extents in the group that are completely described by the first virtual disk file into random access memory, the information associated with a copy of the first identifier. Virtual disk parser 404 in this exemplary embodiment can load a normalized bitmap into random access memory 104. Alternatively, the information could be organized into a table or a data structure rather than a normalized bitmap. In a specific example using a normalized bitmap, the normalized bitmap could be similar to normalized bitmap 810 of FIG. 8, which can be used to describe whether or not a group of virtual disk extents of virtual disk 402 are fully described by child virtual disk file 700. During runtime, in the instance that normalized bitmap indicates that a virtual disk extent is fully present, i.e., all sectors are described by virtual disk file 700, virtual disk parser 404 can read the payload without consulting the sector bitmap. In this example, normalized bitmap 810 loaded into random access 104 can also include the same identifier stored as NB ID 820 stored as NB ID 814. Virtual disk parser 404 can compare the identifiers and determine that normalized bitmap 810 is valid and use it instead of recreating normalized bitmap 810 by reading each sector bitmap it describes.

Referring to operation 1206, it describes an embodiment where computer system 400 can include circuitry configured to change the first identifier in the first virtual disk file to a second identifier after opening the first virtual disk file. For example, and turning briefly to FIG. 8, after normalized bitmap 810 is loaded into memory, virtual disk parser 404 can change the identifier stored as normalized bitmap identifier 820 to a second identifier, e.g., to a second randomly generated alphanumeric value, etc. In one exemplary configuration, virtual disk parser 404 can be configured to change the identifier stored as normalized bitmap identifier 820 when virtual disk file 700 is modified.

Turning back to FIG. 12, operation 1208 shows that computer system 400 can include circuitry for updating the copy of the first identifier associated with the information to the second identifier in response to a determination that the information accurately reflects the state of the virtual disk extents in the group. Again referring to FIG. 8 for context, virtual disk parser 404 can be configured to change the identifier stored as normalized bitmap number 814 and cause one or more IO jobs indicative of the change to be sent to storage device 106 and persisted by persistent storage unit 460. Virtual disk parser 404 can be configured to change the identifier stored as NB ID 814 so that it matches the identifier stored as NB ID 820 in the instance that a determination is made that normalized bitmap 810 accurately reflects the state of the sector bitmaps it covers.

Figure 13:
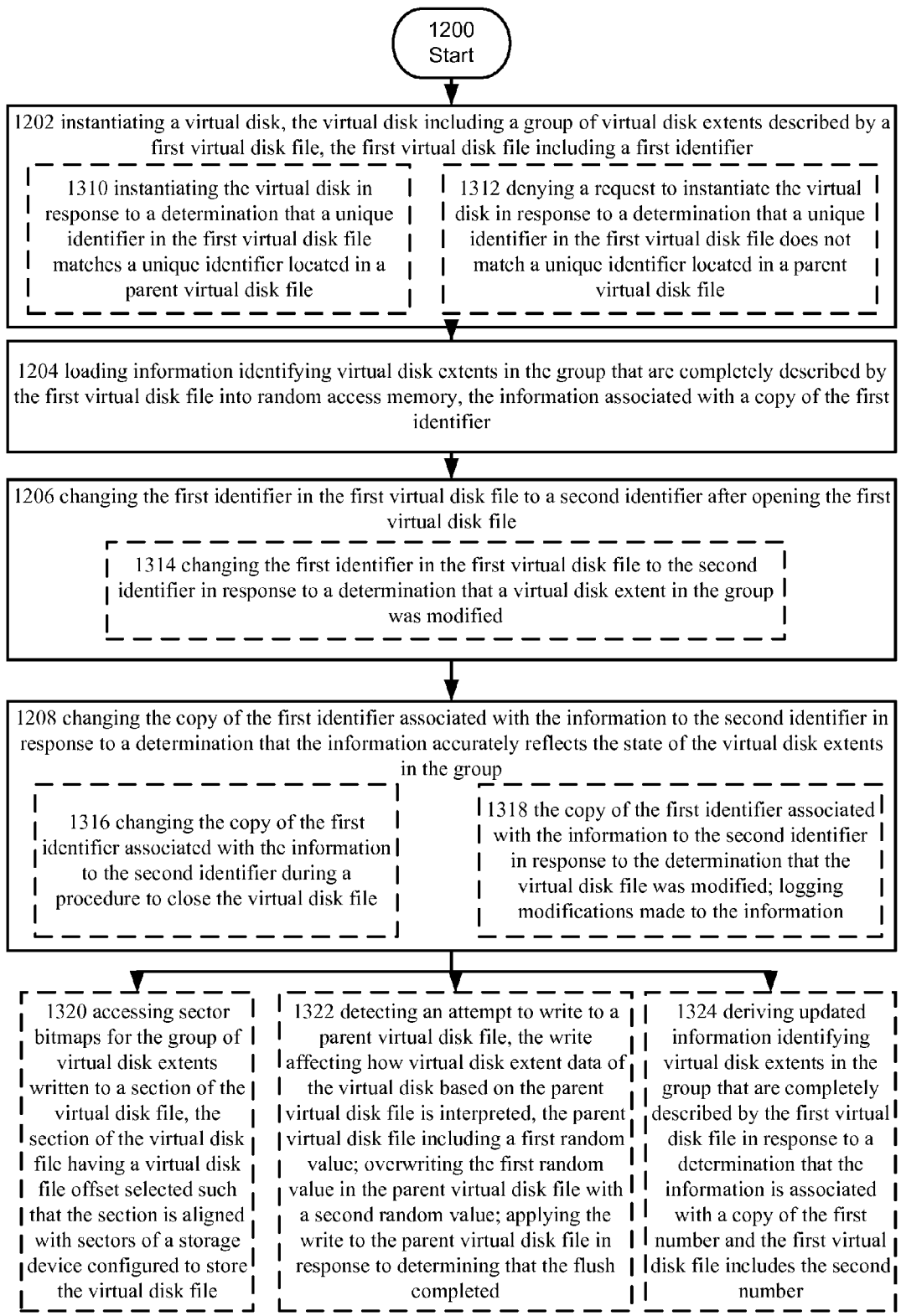
FIG. 13 depicts additional operations that can be executed in conjunction with those illustrated by FIG. 12.

Referring now to FIG. 13, it shows additional operations that can be executed in conjunction with those depicted by FIG. 12. Turning attention to operation 1310 it describes an embodiment where computer system 400 can additionally include circuitry for instantiating the virtual disk in response to a determination that a unique identifier in the first virtual disk file matches a unique identifier located in a parent virtual disk file. For example, and referring to FIG. 7 for context, prior to updating identifiers for normalized bitmaps, virtual disk parser 404 can determine that linkage between virtual disk file 700 and 702 is valid by determining that an identifier stored as parent unique ID 710 matches an identifier stored as unique ID 708. In response to this determination, virtual disk parser 404 can effectuate virtual disk 402. As an aside, the fact that the identifiers match is indicative of the fact that parent virtual disk file 702 was not modified in a way that affected its payload data since child virtual disk file 700 was created.

Turning back to FIG. 13, operation 1312 shows that in an embodiment computer system 400 can additionally include, but is not limited to circuitry for denying a request to instantiate the virtual disk in response to a determination that a unique identifier in the first virtual disk file does not match a unique identifier located in a parent virtual disk file. For example, and turning back to FIG. 7, suppose that sometime later a user attempts to instantiate virtual disk 402 from both virtual disk file 700 and virtual disk file 702. In this example, virtual disk parser 404 can open child virtual disk file 700 and determine the path to parent virtual disk file 702 as well the identifier stored as parent unique identifier 710, which in this example is the first unique identifier. Virtual disk parser 404 can then locate parent virtual disk file 702; open it; and locate the identifier stored as unique identifier 708, which in this example is the second unique identifier. Virtual disk parser 404 can determine that the first identifier is not equal to the second identifier, which is indicative of the fact that parent virtual disk file 702 was modified, and deny the request to instantiate virtual disk 402. In a specific example, virtual disk parser 404 may cause a dialog box to be displayed that includes text that indicates that virtual disk 402 has been corrupted because modifications the base virtual disk file have made it invalid.

Turning back to FIG. 13, operation 1314 indicates that computer system 400 can additionally include circuitry configured to change the first identifier in the first virtual disk file to the second identifier in response to a determination that a virtual disk extent in the group was modified. In an exemplary embodiment, when virtual disk 402 is instantiated virtual disk parser 404 can issue an IO job indicative of a request to change a first identifier stored as NB ID 820 to a second identifier when virtual disk parser 404 detects an attempt to modify contents of virtual disk file 700.

Continuing with the description of FIG. 13, operation 1316 indicates that in an exemplary embodiment, computer system 400 can include circuitry for changing the copy of the first identifier associated with information to the second identifier during a procedure to close the virtual disk file. Again turning to FIG. 8, virtual disk parser 404 can be configured to change the number stored as normalized bitmap number 814 when closing virtual disk 402. Prior to closing virtual disk file 700, virtual disk parser 404 can write a modification to virtual disk file 700 that changes the first identifier to the second identifier. This in turn causes one or more IO jobs to be issued to storage device 106 to change the on-disk first identifier stored as NB ID 810 to the second identifier.

Returning briefly to FIG. 13, operation 1318 illustrates that in an exemplary embodiment computer system 400 can include circuitry configured to change the copy of the first identifier associated with the information to the second identifier in response to the determination that the virtual disk file was modified; and circuitry configured to log modifications made to the information. For example, and again referring to FIG. 8, virtual disk parser 404 can be configured to change the identifier stored as normalized bitmap identifier 814 from the first identifier to the second identifier during the runtime of virtual disk 402 to match the identifier sorted as normalized bitmap identifier 820. In this example, a transaction log or the like can be used to ensure that virtual disk parser 404 keeps normalized bitmap 810 in a state that reflects the state of sector bitmaps for virtual disk extents 0-4.

Returning to FIG. 13, operation 1320 shows that computer system 400 can optionally include circuitry configured to access sector bitmaps for the group of virtual disk extents written to a section of the virtual disk file, the section of the virtual disk file having a virtual disk file offset selected such that the section is aligned with sectors of a storage device configured to store the virtual disk file. In an exemplary embodiment, an IO job can be received by virtual disk parser 404 that causes virtual disk parser 404 to access a section of virtual disk file 602 that stores composite sector bitmap 900. In this example, composite sector bitmap 900 was written to virtual disk file 702 so that it was aligned with the underlying sector size of storage device 106. This alignment improves the overall performance of virtual disk 402 because composite sector bitmap 900 and virtual disk extent payloads are aligned with storage device 106, therefore the chance of crossing a track boundary when reading from a disk-based storage device is reduced.

Now turning back to FIG. 13, operation 1322 shows that computer system 400 can optionally include circuitry configured to detect an attempt to modify information in a parent virtual disk file that affects how virtual disk extent data of the virtual disk based on the parent virtual disk file is interpreted, the parent virtual disk file including a first random value; circuitry configured to overwrite the first random value in the parent virtual disk file with a second random value; circuitry configured to flush the virtual disk file; and circuitry configured to modify the information in the parent virtual disk file in response to receipt of a signal indicating that the flush completed. For example, and turning to FIG. 7, suppose that virtual disk parser 404 determines that an IO job, if applied to virtual disk file 702, will affect how virtual disk 402 is exposed. For example, virtual disk parser 404 can be configured to detect a write operation that causes virtual disk parser 404 to change payload data of parent virtual disk file 702, a write operation that changes information that describes the end of virtual disk 402, a write operation that changes an allocation table entry that in turn changes what section of parent virtual disk file 702 is used to describe a virtual disk extent, etc. In response to detecting such a write operation, virtual disk parser 404 can be configured to change a first random number stored as unique identifier 708 to a second random number; issue a flush (which causes the second random number to be persisted by storage device 106); and then apply the write operation to virtual disk file 702.

Turning back to FIG. 13, operation 1324 shows that computer system 400 can optionally include circuitry configured to derive updated information in response to a determination that the information is associated with a copy of the first number and the first virtual disk file includes the second number. For example, and referring to FIG. 8, suppose that virtual disk parser 404 instantiates virtual disk 402 from, for example, child virtual disk file 700 and parent virtual disk file 702. In this example, virtual disk parser 404 can load normalized bitmap 810 into main memory as well as metadata 704. Virtual disk parser 404 can compare the identifier stored as normalized bitmap identifier 814 to the identifier stored as normalized bitmap identifier 820 and determine that the two identifiers do not match, i.e., normalized bitmap 810 may not reflect the state of sector bitmaps for virtual disk extents 0-4. In response to this determination, virtual disk parser 404 can be configured to derive new information for normalized bitmap 810 by reading sector bitmaps for virtual disk extents 0 through 4. For each virtual disk extent that is completely defined by its corresponding sector bitmap, i.e., the corresponding bitmap includes all ones, virtual disk parser 404 can store a one in normalized bitmap 810. For each virtual disk extent that is not completely defined by its corresponding sector bitmap virtual disk parser 404 can store a 0 in normalized bitmap 810. After normalized bitmap 810 is updated to reflect the state of its associated virtual disk extents, virtual disk parser 404 can use normalized bitmap 810 during runtime of virtual disk 402.

Figure 14:
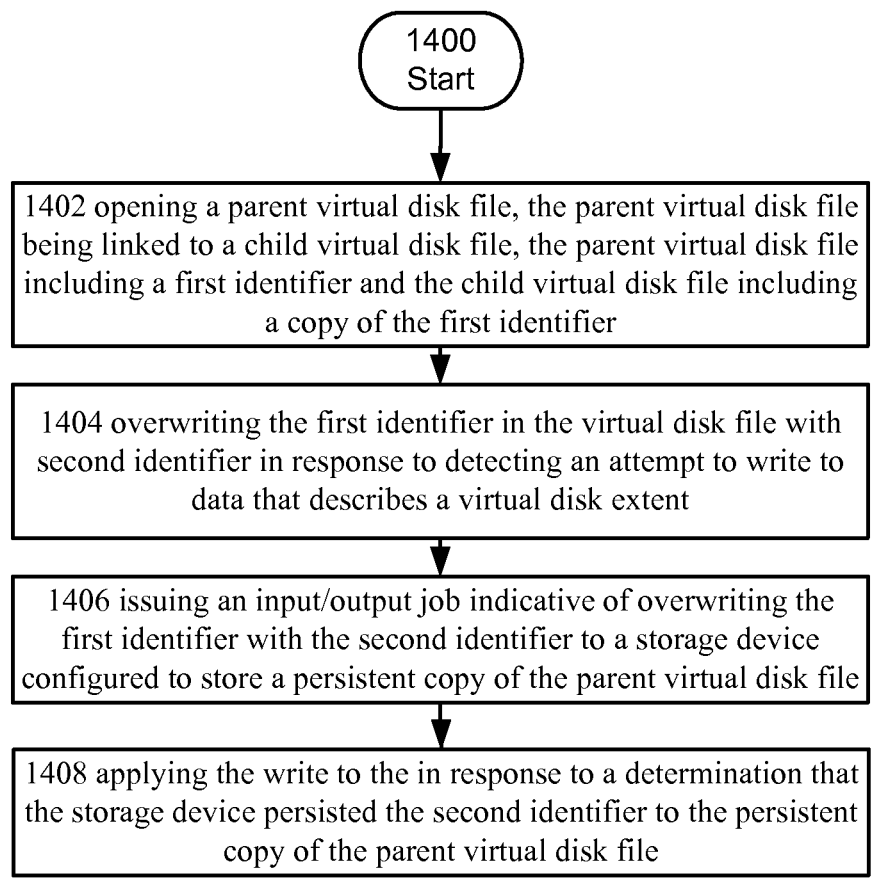
FIG. 14 depicts an operational procedure that can be embodied within a computer-readable storage medium and/or executed by a computer system.

Turning now to FIG. 14, it shows an operational procedure that can be executed by computer system 400 including operations 1400, 1402, 1404, 1406, 1408, and 1410. Operation 1400 begins the operational procedure and operation 1402 illustrates that in an embodiment computer system 400 can be configured to include circuitry for opening a parent virtual disk file, the parent virtual disk file being linked to a child virtual disk file, the parent virtual disk file including a virtual disk extent and a first identifier stored as a unique identifier identifying the parent virtual disk file, and the child virtual disk file including a copy of the first identifier. For example, and turning to FIG. 4, computer system 400 can include virtual disk parser 404, which can be a module of executable instructions. In an exemplary embodiment, virtual disk parser 404 can be executed by a processor such as processor 102 of FIG. 1 and issue a request to open a virtual disk file to virtualization system file system 408. In a specific instance, the request could be to open a virtual disk file that is a parent of another virtual disk file, e.g., virtual disk file 500, 604, 606, or 610 of FIG. 6. Here, a user may have decided to the open virtual disk file in order to modify some of the information stored therein. For example, suppose the user opened the virtual disk file as a virtual disk of a virtual machine in order to apply a patch and he or she may not know that another virtual disk file is dependent upon the contents of the virtual disk.

Returning to FIG. 14, operation 1404 shows that computer system 400 can additionally include circuitry for overwriting the first identifier in the virtual disk file with second identifier in response to detecting an attempt to modify data that describes a virtual disk extent. After opening a virtual disk file virtual disk parser 404 can be executed by processor 102 and detect that a change has been made to data that will affect the payload it stores.

Turning back to FIG. 14, operation 1406 describes an instance where computer system 400 additionally includes circuitry for issuing an input/output job indicative of overwriting the first identifier with the second identifier to a storage device configured to store a persistent copy of the parent virtual disk file. Virtual disk parser 404 can include logic that can detect when it is directed to make a modification that affects the payload of a virtual disk extent and, prior to making the change, issue one or more IO jobs to storage device 106 that change the on-disk copy of the first unique identifier stored as unique ID 708 to a second unique identifier.

Referring to operation 1408 of FIG. 14, it illustrates that in an embodiment computers system 400 can include circuitry for issuing a flush command to the storage device. For example, and again turning to FIG. 4, after the IO job indicative of the request to overwrite the first identifier with a second identifier virtual disk parser 404 can send a flush command to storage device 106. Storage device 106 can receive a flush command and write the contents of cache 454 to persistent storage unit 460, e.g., a platter or one or more flash memory cells, and the second random value can be persisted.

Operation 1410 of FIG. 14 shows that computer system 400 can additionally include circuitry for modifying the data that describes the virtual disk extent in response to receipt of a signal indicating that the storage device persisted the contents of the internal cache. After the flush command is issued and a failure message is not received or an acknowledgement indicating that the flush was successful is received, virtual disk parser 404 can modify a section of parent virtual disk file that describes the virtual disk extent. This in turn causes on or more IO jobs to be sent to storage device 106 that cause the modification to be persisted.

Figure 15:
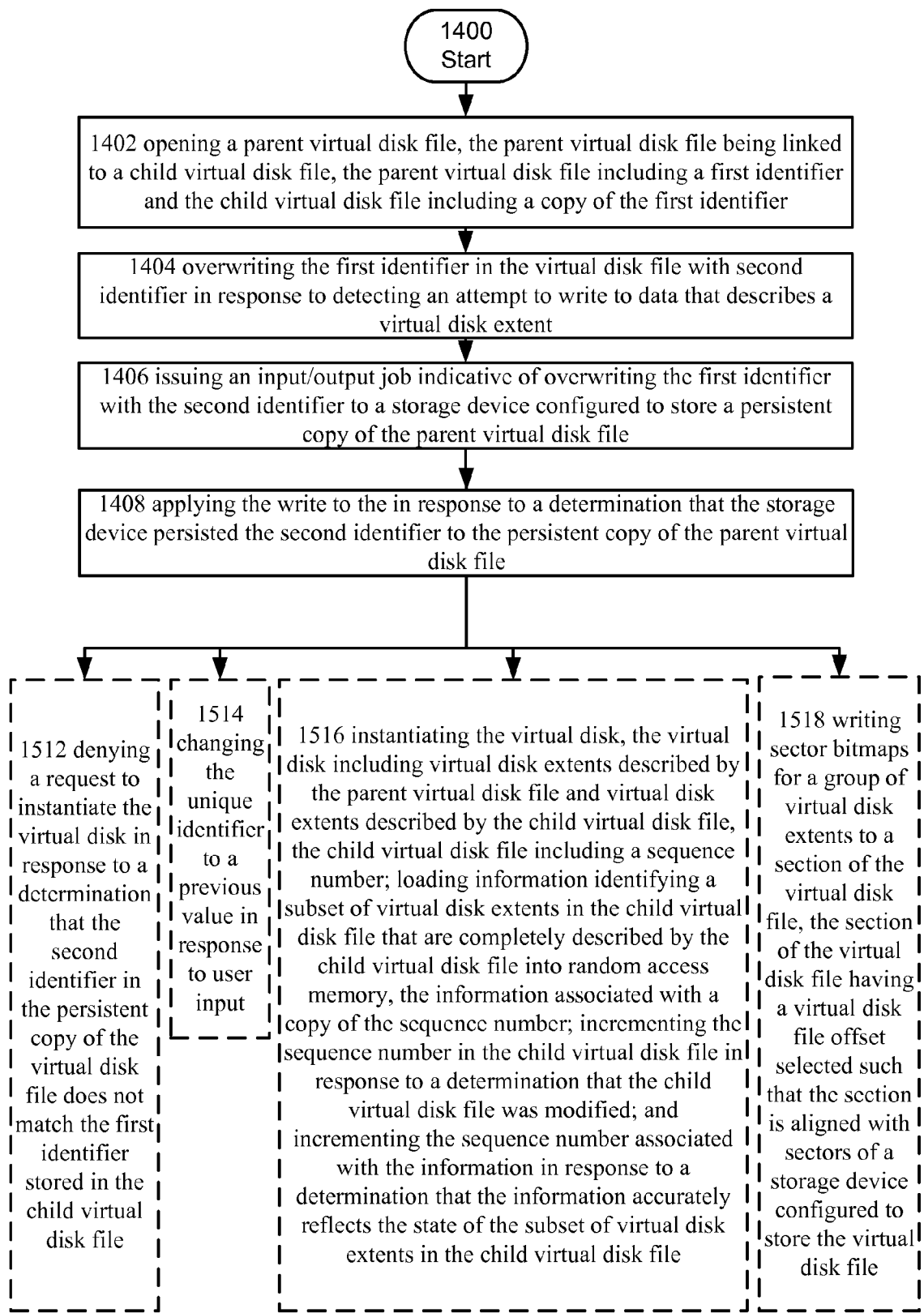
FIG. 15 depicts additional operations that can be executed in conjunction with those illustrated by FIG. 14.

Turning now to FIG. 15, it illustrates additional operations that can be executed in conjunction to those illustrated by FIG. 14. Referring to operation 1512, it shows that computer system can be optionally configured to include circuitry for denying a request to instantiate the virtual disk in response to a determination that the second identifier in the persistent copy of the virtual disk file does not match the first identifier stored in the child virtual disk file. For example, and turning back to FIG. 7, suppose that sometime later a user attempts to instantiate virtual disk 402 from both virtual disk file 702 and virtual disk file 702. In this example, virtual disk parser 404 can determine that the first identifier is not equal to the second identifier, which is indicative of the fact that parent virtual disk file 702 was modified, and deny the request to instantiate virtual disk 402. In a specific example, virtual disk parser 404 may cause a dialog box to be displayed that includes text that indicates that virtual disk 402 has been corrupted because modifications the base virtual disk file have made it invalid.

Continuing with the description of FIG. 15, operation 1514 shows that computer system 400 can include circuitry for changing the unique identifier to a previous value in response to user input. For example, and again turning back to FIG. 7, suppose that a user attempts to instantiate virtual disk 402. Rather than denying the request as described in the preceding paragraph, virtual disk parser 404 can cause a dialog box to be displayed that directs virtual disk parser 404 to attempt to instantiate virtual disk 402 regardless of whether virtual disk 402 is corrupted or not. In the instance that virtual disk 402 is successfully opened, virtual disk parser 404 can copy the identifier stored as parent unique identifier 710, i.e., the first unique identifier, and overwrite the identifier stored as unique identifier 708, i.e., the second unique identifier and indicate that a repair operation was a success.

Continuing with the description of FIG. 15, operation 1516 shows that computer system 400 can include circuitry for instantiating the virtual disk, the virtual disk including virtual disk extents described by the parent virtual disk file and virtual disk extents described by the child virtual disk file, the child virtual disk file including a sequence number; circuitry for loading information identifying a subset of virtual disk extents in the child virtual disk file that are completely described by the child virtual disk file into random access memory, the information associated with a copy of the sequence number; circuitry for incrementing the sequence number in the child virtual disk file in response to a determination that the child virtual disk file was modified; and circuitry for incrementing the sequence number associated with the information in response to a determination that the information accurately reflects the state of the subset of virtual disk extents in the child virtual disk file. For example, suppose that virtual disk 402 is instantiated and virtual disk parser 404 loads a normalized bitmap into random access memory. Alternatively, the information could be organized into a table rather than a normalized bitmap. Normalized bitmap can be associated with a normalized bitmap identifier, e.g., a random number, a sequence number, etc., and the identifier can indicate that when the normalized bitmap was accurate for the sector bitmaps it covers. In a specific example, suppose that the normalized bitmap is similar to normalized bitmap 810 of FIG. 8. As shown by the figure, normalized bitmap can be associated with an identifier stored as normalized bitmap identifier 814.

Virtual disk parser 404 can be configured in an exemplary embodiment to determine whether virtual disk file 702 has been modified and, in response to receipt of a request to change data within virtual disk file 702, e.g., metadata and/or payload data, virtual disk parser 404 can check an identifier in memory to see if this is the first modification since virtual disk file 702 has been opened. In this configuration, when the modification is the first one since virtual disk file 702 was opened, virtual disk parser 404 can change the identifier stored as NB identifier 820 to a second NB identifier by causing one or more IO jobs indicative of the change to be issued to storage device 106. In an alternative configuration, virtual disk parser 404 can change the identifier stored as NB identifier 820 to a second NB identifier by causing one or more IO jobs indicative of the change to be issued to storage device 106 as soon as virtual disk file 702 is opened in read/modify mode. At this point in time, on-disk version of virtual disk file 702 includes different identifiers for normalized number 820 and normalized bitmap number 814, if virtual disk parser 404 crashes the next time virtual disk file 602 is opened by virtual disk parser 404 the numbers will not match. This indicates that normalized bitmap 810 may not accurately reflect the contents of the sector bitmaps it covers.

In the instance that virtual disk parser 404 is programmed to maintain normalized bitmaps, e.g., to update normalized bitmap 810 when the sector bitmaps for virtual disk extents 0-4 transition into the fully described state, virtual disk parser 404 can also be configured to change normalized bitmap identifier 814 to equal persisted normalized bitmap identifier 820 and issue an IO job to storage device 106 to persist the change. As described in more detail above, the change to the identifier stored as normalized bitmap identifier 814 can be made when virtual disk parser 404 is closing child virtual disk file 700 or as soon as the change is made to persisted normalized bitmap number 820, in the instance that transactional logs or some other logging mechanism is used to ensure that changes made to the in memory version of normalized bitmap 810 are successfully committed to persistent storage unit 460.

Continuing with the description of FIG. 15, operation 1518 shows that computer system 400 can include circuitry for writing sector bitmaps for a group of virtual disk extents to a section of the virtual disk file, the section of the virtual disk file having a virtual disk file offset selected such that the section is aligned with sectors of a storage device configured to store the virtual disk file. In an exemplary embodiment, an IO job can be received by virtual disk parser 404 that causes virtual disk parser 404 to access a section of virtual disk file 602 that stores composite sector bitmap 900. In this example, composite sector bitmap 900 was written to virtual disk file 702 so that it was aligned with the underlying sector size of storage device 106. This alignment improves the overall performance of virtual disk 402 because composite sector bitmap 900 and virtual disk extent payloads are aligned with storage device 106, therefore the chance of crossing a track boundary when reading from a disk-based storage device is reduced.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A non-transitory computer-readable storage media tangibly embodying instructions that upon execution by a processor cause the processor to:
   open a virtual disk file, the virtual disk file including a unique identifier identifying the virtual disk file and virtual disk extent data that forms at least a part of the data in a virtual disk, wherein a first unique identifier is stored as the unique identifier;
   overwrite the first unique identifier stored as the unique identifier in the virtual disk file with a second unique identifier in response to detecting an attempt to write information to the virtual disk file that affects how virtual disk extent data is interpreted;
   determine that the second unique identifier was written to a persistent copy of the virtual disk file; and
   write the information to the virtual disk file in response to determining that the second unique identifier was written to the persistent copy of the virtual disk file.

2. The non-transitory computer-readable storage media of claim 1, the instructions that upon execution cause the processor to overwrite the first unique identifier further comprising instructions that upon execution cause the processor to:
   overwrite the first unique identifier in response to detecting the attempt to write to a bit pattern of a virtual disk extent.

3. The non-transitory computer-readable storage media of claim 1, further comprising instructions that upon execution cause the processor to:
   deny a request to instantiate the virtual disk in response to a determination that the second unique identifier obtained from the virtual disk file is not equal to a unique identifier stored in a parent virtual disk file of the virtual disk file.

4. The non-transitory computer-readable storage media of claim 1, further comprising instructions that upon execution cause the processor to:
   change the second unique identifier to the first unique identifier in response to user input.

5. The non-transitory computer-readable storage media of claim 1, further comprising instructions that upon execution cause the processor to:

associate a number with information identifying virtual disk extents in a group that are completely described by a child virtual disk file;

update a copy of the number in the child virtual disk file to a second number in response to a determination that data in the virtual disk file was modified; and update the number associated with the information to the second number in response to a determination that the information accurately reflects a state of the virtual disk extents in the group.

6. The non-transitory computer-readable storage media of claim 1, further comprising instructions that upon execution cause the processor to:

access sector bitmaps for a group of virtual disk extents written to a section of the virtual disk file, the section of the virtual disk file having a virtual disk file offset selected such that the section is aligned with sectors of a storage device configured to store the virtual disk file.

7. A computer system, comprising:

a processor; and a memory, the memory in electronic communication with the processor when powered, the memory including instructions that upon execution by the processor cause the processor to:

instantiate a virtual disk, the virtual disk including a group of virtual disk extents described by a first virtual disk file, the first virtual disk file including a unique identifier identifying the first virtual disk file, wherein a first identifier is stored as the unique identifier;

load information identifying virtual disk extents in the group that are completely described by the first virtual disk file into random access memory, the information associated with a copy of the first identifier;

change the first identifier in to a second identifier after opening the first virtual disk file; and change the copy of the first identifier associated with the information to the second identifier in response to a determination that the information accurately reflects a state of the virtual disk extents in the group.

8. The computer system of claim 7, the instructions that upon execution cause the processor to instantiate the virtual disk further comprising instructions that upon execution cause the processor to:

instantiate the virtual disk in response to a determination that the unique identifier in the first virtual disk file matches a unique identifier located in a parent virtual disk file.

9. The computer system of claim 7, the instructions that upon execution cause the processor to instantiate the virtual disk further comprising instructions that upon execution cause the processor to:

deny a request to instantiate the virtual disk in response to a determination that the unique identifier in the first virtual disk file does not match a unique identifier located in a parent virtual disk file.

10. The computer system of claim 7, the instructions that upon execution cause the processor to change the first identifier in the first virtual disk file further comprise instructions that upon execution cause the processor to:

change the first identifier in the first virtual disk file to the second identifier in response to a determination that a virtual disk extent in the group was modified.

11. The computer system of claim 7, the instructions that upon execution cause the processor to change the copy of the first identifier associated with the information further comprise instructions that upon execution cause the processor to:

change the copy of the first identifier associated with information to the second identifier during a procedure to close the virtual disk file.

12. The computer system of claim 7, the instructions that upon execution cause the processor to change the copy of the first identifier associated with the information further comprise instructions that upon execution cause the processor to:

change the copy of the first identifier associated with the information to the second identifier in response to the determination that the virtual disk file was modified; and log modifications made to the information.

13. The computer system of claim 7, further comprising instructions that upon execution cause the processor to:

access sector bitmaps for the group of virtual disk extents written to a section of the virtual disk file, the section of the virtual disk file having a virtual disk file offset selected such that the section is aligned with sectors of a storage device configured to store the virtual disk file.

14. The computer system of claim 7, further comprising instructions that upon execution cause the processor to:

detect an attempt to modify information in a parent virtual disk file that affects how virtual disk extent data of the virtual disk based on the parent virtual disk file is interpreted, the parent virtual disk file including a first random value;

overwrite the first random value in the parent virtual disk file with a second random value;

flush the second random value to a persistent copy of the virtual disk file; and modify the information in the parent virtual disk file in response to receipt of a signal indicating that the flush completed.

15. The computer system of claim 7, further comprising instructions that upon execution cause the processor to:

derive updated information in response to a determination that the information is associated with a copy of the first identifier and the first virtual disk file includes the second identifier.

16. A computer implemented method, comprising:

opening a parent virtual disk file, the parent virtual disk file being linked to a child virtual disk file, the parent virtual disk file including a virtual disk extent and a first identifier stored as a unique identifier identifying the parent virtual disk file, and the child virtual disk file including a copy of the first identifier;

overwriting the first identifier in the parent virtual disk file with a second identifier in response to detecting an attempt to modify data affecting how the virtual disk extent is interpreted;

issuing an input/output job indicative of overwriting the first identifier with the second identifier to a storage device configured to store a persistent copy of the parent virtual disk file;

issuing a flush command to the storage device; and modifying the data affecting how the virtual disk extent is interpreted in response to receipt of a signal indicating that the storage device persisted contents of an internal cache.

17. The computer implemented method of claim 16, further comprising:

denying a request to instantiate a virtual disk in response to a determination that the second identifier in the persistent copy of the virtual disk file does not match the first identifier stored in the child virtual disk file.

18. The computer implemented method of claim 16, further comprising:
   changing the first identifier to a previous value in response to user input.

19. The computer implemented method of claim 16, further comprising:
   instantiating a virtual disk, the virtual disk including virtual disk extents described by the parent virtual disk file and virtual disk extents described by the child virtual disk file, the child virtual disk file including a sequence number;
   loading information identifying a subset of virtual disk extents in the child virtual disk file that are completely described by the child virtual disk file into random access memory, the information associated with a copy of the sequence number;
   incrementing the sequence number in the child virtual disk file in response to a determination that the child virtual disk file was modified; and
   incrementing the sequence number associated with the information in response to a determination that the information accurately reflects a state of the subset of virtual disk extents in the child virtual disk file.

20. The computer implemented method of claim 16, further comprising:
   writing sector bitmaps for a group of virtual disk extents to a section of the virtual disk file, the section of the virtual disk file having a virtual disk file offset selected such that the section is aligned with sectors of a storage device configured to store the virtual disk file.

* * * * *